(12) United States Patent
Sivinski et al.

(10) Patent No.: US 12,245,540 B2
(45) Date of Patent: Mar. 11, 2025

(54) AGRICULTURAL ROW UNIT ACCESSORY

(71) Applicant: Harvest International, Inc., Storm Lake, IA (US)

(72) Inventors: Jeffrey Alan Sivinski, Cherokee, IA (US); Byron James Friesen, Storm Lake, IA (US); Garry D. Friesen, Storm Lake, IA (US)

(73) Assignee: Harvest International, Inc., Storm Lake, IA (US)

( * ) Notice: Subject to any disclaimer, the term of this patent is extended or adjusted under 35 U.S.C. 154(b) by 80 days.

(21) Appl. No.: 17/657,896

(22) Filed: Apr. 4, 2022

(65) Prior Publication Data

US 2022/0225561 A1 Jul. 21, 2022

Related U.S. Application Data

(63) Continuation of application No. 17/446,009, filed on Aug. 26, 2021, which is a continuation of application
(Continued)

(51) Int. Cl.
*A01C 5/06* (2006.01)
*A01B 15/12* (2006.01)
(Continued)

(52) U.S. Cl.
CPC .............. *A01C 5/064* (2013.01); *A01B 15/12* (2013.01); *A01B 15/16* (2013.01); *A01C 7/006* (2013.01);
(Continued)

(58) Field of Classification Search
CPC ......... A01C 5/064; A01C 13/00; A01C 15/00; A01C 5/06; A01C 5/00; A01C 7/00;
(Continued)

(56) References Cited

U.S. PATENT DOCUMENTS

| D272,069 S | 1/1984 | Larsson |
|---|---|---|
| D272,070 S | 1/1984 | Larsson |

(Continued)

FOREIGN PATENT DOCUMENTS

| AU | 2009100124 A4 | 3/2009 |
|---|---|---|
| CA | 2927668 A1 | 12/2016 |

(Continued)

OTHER PUBLICATIONS

Dawn Floating Trashwheels™ Row Cleaners, http://www.dawnequipment.com/Floating_Trashwheels.html, pp. 1-11, Nov. 8, 2021.
(Continued)

*Primary Examiner* — Christopher J. Novosad
(74) *Attorney, Agent, or Firm* — McKee, Voorhees & Sease, PLC

(57) ABSTRACT

A tool assembly for a planter row unit resides at the forward end of the row unit beneath the tool bar. The assembly includes a bracket assembly connected to the row unit, with a ground engaging tool removably mounted on the bracket assembly for movement between raised and lowered positions. A linear actuator controls the position of the tool. The tool may also include a depth control mechanism. Different tools can be interchanged on the bracket assembly.

13 Claims, 30 Drawing Sheets

Related U.S. Application Data

No. 16/352,179, filed on Mar. 13, 2019, now Pat. No. 11,185,008.

(60) Provisional application No. 62/643,862, filed on Mar. 16, 2018.

(51) Int. Cl.
| | | |
|---|---|---|
| *A01B 15/16* | (2006.01) | |
| *A01C 7/00* | (2006.01) | |
| *A01C 7/20* | (2006.01) | |
| *A01C 13/00* | (2006.01) | |
| *A01C 15/00* | (2006.01) | |

(52) U.S. Cl.
CPC .............. *A01C 7/201* (2013.01); *A01C 7/203* (2013.01); *A01C 13/00* (2013.01); *A01C 15/00* (2013.01)

(58) Field of Classification Search
CPC ........... A01C 7/20; A01C 7/006; A01C 7/203; A01C 7/201; A01B 15/12; A01B 15/16; A01B 15/00
See application file for complete search history.

(56) References Cited

U.S. PATENT DOCUMENTS

| | | | |
|---|---|---|---|
| D272,250 S | 1/1984 | Larsson | |
| 4,796,550 A | 1/1989 | Van Natta et al. | |
| 5,341,754 A | 8/1994 | Winterton | |
| 5,497,716 A | 3/1996 | Shoup | |
| 6,070,673 A | 6/2000 | Wendte | |
| D440,983 S | 4/2001 | Miller et al. | |
| 6,253,692 B1 | 7/2001 | Wendling et al. | |
| D455,762 S | 4/2002 | Kaczmarski et al. | |
| D645,061 S | 9/2011 | Plummer | |
| D709,529 S | 7/2014 | Hutchinson et al. | |
| 9,232,687 B2 | 1/2016 | Bassett | |
| D782,545 S | 3/2017 | Forth | |
| 9,743,572 B2 | 8/2017 | Martin | |
| D824,430 S | 7/2018 | Sivinski et al. | |
| D840,282 S | 2/2019 | Coste | |
| D850,887 S | 6/2019 | Solow | |
| D868,845 S | 12/2019 | Sonerud | |
| 10,555,452 B2 | 2/2020 | Martin et al. | |
| 11,185,008 B2 * | 11/2021 | Sivinski ................. | A01C 13/00 |
| 12,041,869 B2 * | 7/2024 | Sivinski ................. | A01C 5/064 |
| 2011/0155031 A1 | 6/2011 | Amett et al. | |
| 2014/0262377 A1 | 9/2014 | Winick et al. | |
| 2016/0150714 A1 | 6/2016 | Unruh | |
| 2017/0258002 A1 | 9/2017 | Sivinski | |
| 2018/0153087 A1 * | 6/2018 | Kovach ............... | A01B 61/042 |
| 2019/0281756 A1 | 9/2019 | Sivinski | |

FOREIGN PATENT DOCUMENTS

| | | |
|---|---|---|
| DE | 1967917 U | 9/1967 |
| DE | 19748837 A1 | 5/1999 |
| EP | 3228170 A1 | 10/2017 |
| WO | 2009149473 A2 | 12/2009 |
| WO | 2010003142 A2 | 1/2010 |

OTHER PUBLICATIONS

Martin-Till, "ACCR Compact Floating Row Cleaner", Brochure, 1 page, 2021.
Yetter Farm Equipment, "2940-010 Air Adjust™ Coulter/Row Cleaner Combo", https://www.yetterco.com/products/27-plantermount-row-cleaner-combos/298-2940010-air-adjust-coulterrow-cleaner-combo, pp. 1-4, Nov. 8, 2021.

* cited by examiner

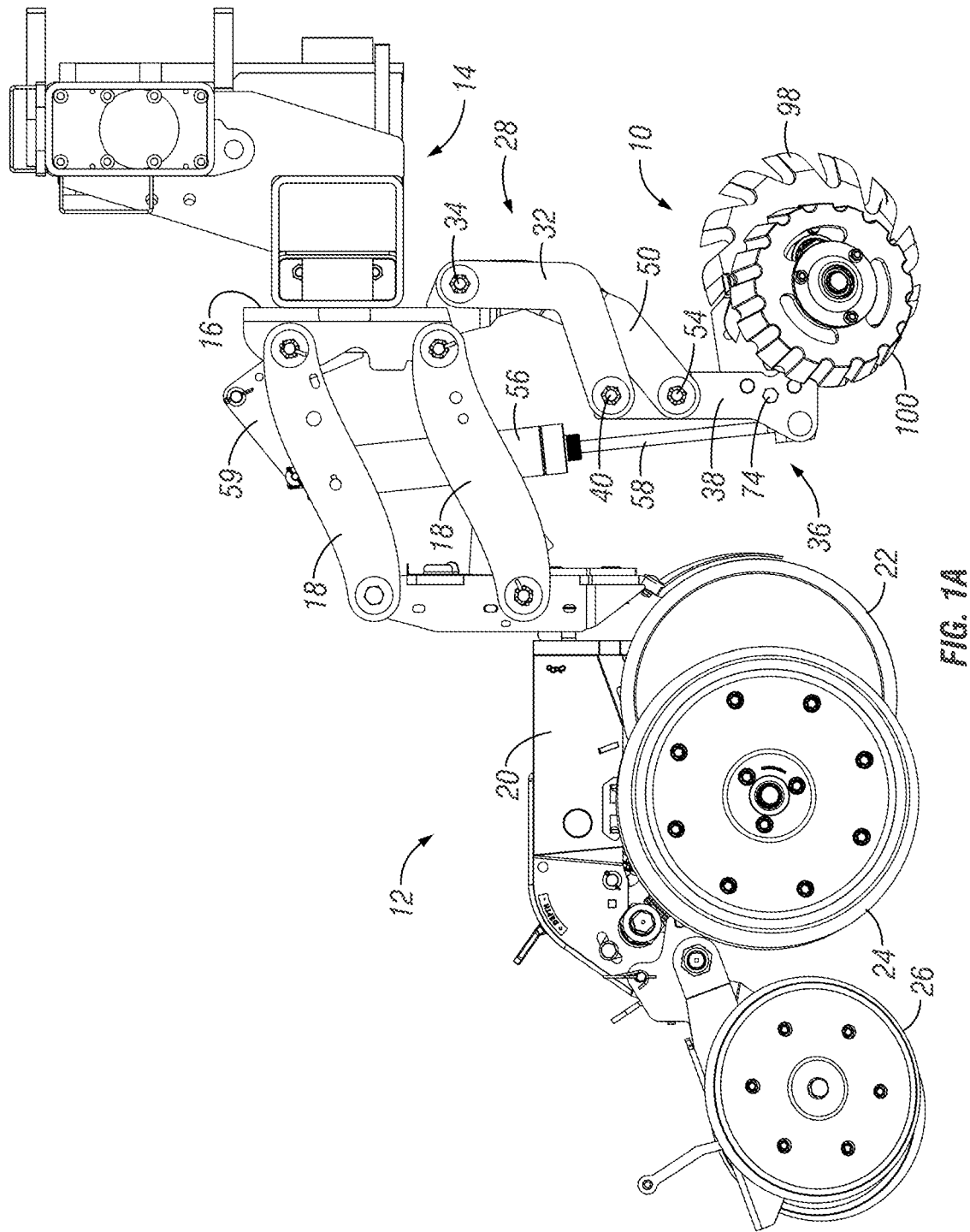

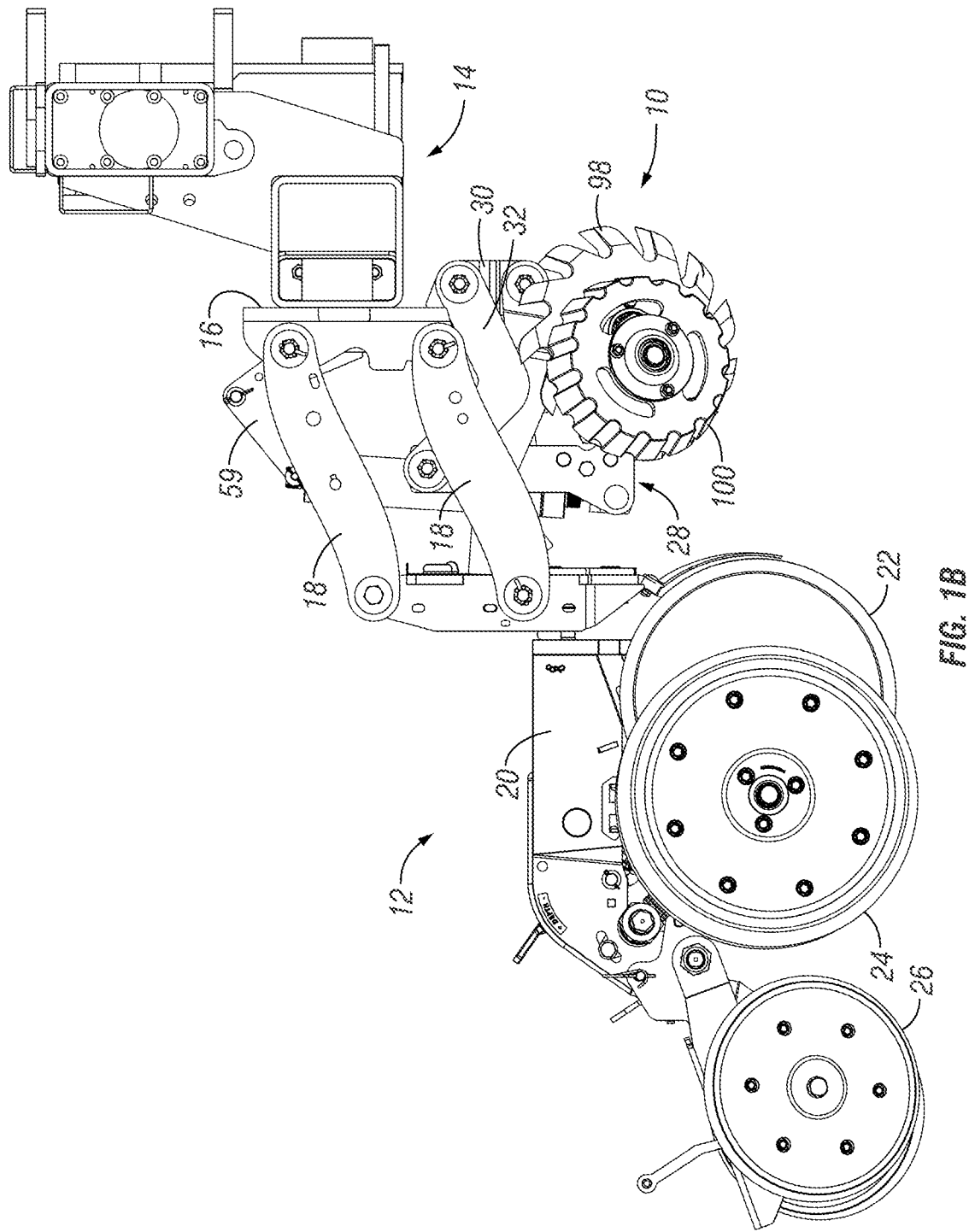

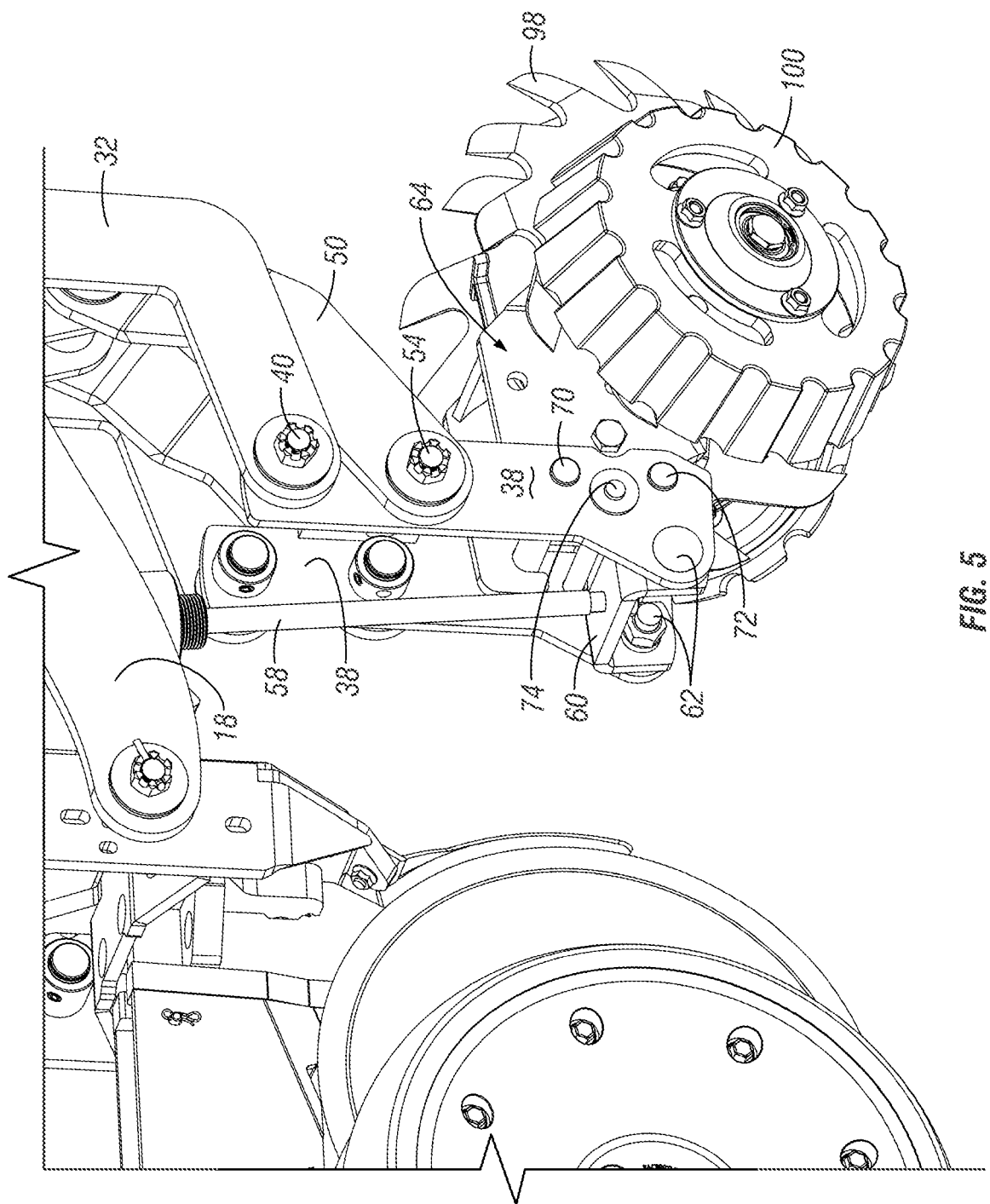

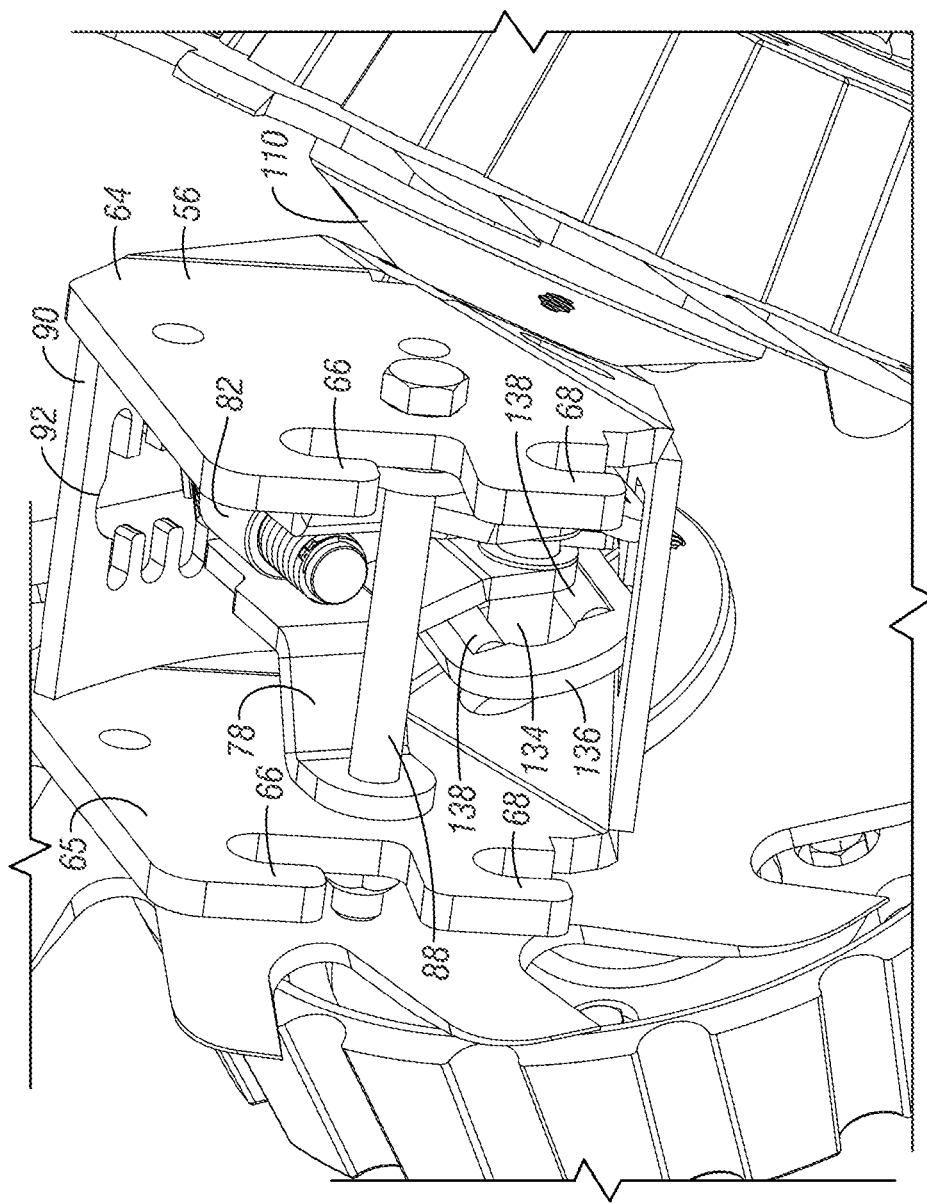

AGRICULTURAL ROW UNIT ACCESSORY

CROSS-REFERENCE TO RELATED APPLICATIONS

This is a continuation application of U.S. Ser. No. 17/446,009, filed Aug. 26, 2021 and U.S. Ser. No. 16/352,179, filed Mar. 13, 2019, which claim priority to Provisional Application U.S. Ser. No. 62/643,862, filed on Mar. 16, 2018, all of which are herein incorporated by reference in their entirety.

BACKGROUND OF THE INVENTIONS

Modern agriculture row crop planters are operating in less tilled soils or no-till applications, due to decreased profit margins resulting from tillage costs, increased environmental concerns due to tillage, increased use of cover crops to control chemical resistant weeds, increased farm efficiency due to less tillage, and increased soil health and fertility.

To counter these changes in planting practices, row cleaners also known as "trash whippers", "residue managers" and other various names, have been added to conventional planter row units to cut, slice or move crop residue away from the planter row unit, prior to the row unit planting the seed in the soil. A clean planting seedbed is crucial to optimal crop yields and these cleaners greatly enhance a clean seedbed.

Current aftermarket row cleaner manufactures have created various designs of cleaning disc mounting brackets and configurations, but most bolt to the face plate of the row unit shank or to the side of the row unit mounting plate. These row cleaner designs vary and include cleaners which are fixed, cleaners having manually adjustable depth control, and floating row cleaner disc designs that are controlled with air or hydraulic cylinders.

Mounting the row cleaner to the front of the row unit shank adds additional draft load to the planter parallel link arms and row unit frame, and increases the risk of seed singulation issues, due to vibration caused from the row cleaners. Row unit mounted row cleaners also increase need for additional down pressure on the row unit to maintain the desired operating depth.

A majority of the floating row cleaners on the market today offer a single arm design with a pivot axis that allows the whole row cleaner assembly to pivot up/down about this axis. In single arm designs, the row cleaner discs change angle as the row cleaner pivots up and down, thus changing the angle of attack of the disc with the soil. This angle of attack change greatly affects how the row cleaner functions and the amount of residue that is moved out of the seedbed. If the row cleaner is too aggressive, a trench can be created which leaves the seedbed without pre-applied herbicide and potentially fertilizer. If the row cleaner is not aggressive enough, the seedbed is not cleaned of residue and "hair pinning" of trash in the seed trench can occur, leading to reduced yield.

Current row cleaner depth bands or gauge wheels are fixed to the side of the row cleaner disc and the only depth control is determined by the amount of pressure on the row cleaner through an air or hydraulic cylinder. This prior art system can cause the need for frequent adjustments to eliminate too aggressive or inadequate seedbed cleaning, as mentioned previously.

Accordingly, a primary objective of the present invention is the provision of an improved row unit cleaning accessory.

Another objective of the present invention is the provision of an accessory system for planter row units which is mounted to the frame of the row unit mounting bracket.

A further objective of the present invention is the provision of a planter row unit accessory system which is not directly mounted to the row unit shank.

Still another objective of the present invention is the provision of a row unit cleaning accessory which minimizes or eliminates draft load.

Yet another objective of the present invention is the provision of a row unit accessory system which reduces vibration.

A further objective of the present invention is the provision of a row cleaner system for a planter row unit which reduces seed meter singulation errors.

Another objective of the present invention is the provision of a row cleaner system for planter row unit which eliminates additional down force on the row unit.

Still another objective of the present invention is the provision of a row unit accessory system which maintains proper seed planting depth.

A further objective of the present invention is the provision of a row unit accessory tool having a hydraulic or pneumatic cylinder, or other mechanical force, such as springs, to maintain desired contact with the soil.

Another objective of present invention is the provision of an accessory tool system for planter row units having a quick release designed for quickly changing two different tools.

A further objective of the present invention is the provision of a row cleaner accessory for a planter row unit having adjustable gauge wheels.

These and/or other objects, features, and advantages of the disclosure will be apparent to those skilled in the art. The present invention is not to be limited to or by these objects, features and advantages. No single embodiment need provide each and every object, feature, or advantage.

SUMMARY OF THE INVENTION

The planter row unit and accessory system offers an integrated mounting bracket assembly for the row accessory tools on the planter row unit mounting bracket frame and is not directly mounted to the planter row unit shank. This design removes the draft load from the planter row unit parallel link arms, reduces the potential for row unit vibration, which can reduce seed meter singulation issues, and eliminates additional downforce or upforce on the planter row unit required to maintain proper seed depth. The mounting system for the accessory to the row unit allows the planter row unit and accessory to function together as a complete assembly. This system also utilizes an air or hydraulic down/up force cylinder, or spring or other actuator, to maintain the desired contact of the accessory tool with the soil.

Parallel link arm assemblies in conjunction with tapered greaseless non-metallic bushings and pressed in tapered bearing races are utilized to maintain the correct angle of attack with the soil and row accessory tools. This system provides the ability to remove "play" or wear in the link arm pivot points of the parallel link arms by simply removing a cotter pin, adjusting the castle nut to remove "play" and re-inserting the cotter pin. The accessory tool system also incorporated a "quick release" design that allows the operator to quickly change different configurations of tools, such as row cleaners, fertilizer application tools, small in-row rolling baskets, tillage sweeps, coulters, cover crop rollers and/or other types of ground engaging or residue removal tools. The quick release system only requires the operator to remove the quick release retention pin, slightly lift the assembly and replace it with a different tool configuration and replace the retention pin.

In addition to the integrated design of the accessory and in the planter row unit, a row cleaner type tool utilizes adjustable depth gauge wheel design that is unique to the row cleaner industry.

The accessory gauge wheel and disc on each side of the cleaner frame are mounted on separate spindles. The gauge wheel spindle extends through the hollow disc spindle, to allow the depth control gauge wheel to be adjusted up/down to maintain constant depth of the row cleaner disc, regardless of soil conditions. This also allows constant down/up pressure from the air or hydraulic cylinder to be applied to the row cleaner tool, to maintain consistent seedbed cleaning in varying soil conditions.

The depth control gauge wheel spindle is secured to an outer right-angle disc and the gauge wheel is bolted to the arm so that the rotational axis of the wheel is offset with respect to the spindle axis. The inner end of the wheel spindle is fixed to an adjustment arm operatively connected to a depth control handle. This allows the gauge wheel depth control to move the depth gauge wheel up or down on the row cleaner disc, so as to adjust the operating depth.

The accessory depth gauge wheel operating position is determined by a depth control handle that is changed in position by pulling the spring-loaded handle out and moving the handle to the desired notch in the row cleaner tool frame. This arm then transfers this handle movement to the gauge wheel arms through a slider rod in the depth control handle assembly that is tangent to rods welded to the inner depth control arms. Additionally, the disc cleaner hollow spindle is equipped with a nonmetallic greaseless bushing and dust seals at both ends to eliminate dust build up that can cause binding of the depth control arm pivot shaft.

BRIEF DESCRIPTION OF THE DRAWINGS

FIG. 1A is a side elevation view of a planter row unit mounted on a tool bar with the cleaner or sweep of the present invention mounted thereon and moved to a lowered, ground-engaging position.

FIG. 1B is a view similar to FIG. 1A showing the cleaner or sweep in a raised position above the ground.

FIG. 5 is an enlarged rear perspective view of the sweep in the lowered position.

FIG. 6B is another exploded view of the row unit and sweep.

FIG. 7 is a rear perspective view of the sweep frame, detached from the row unit.

FIG. 17A it is a rear perspective view of the sweep frame.

FIG. 17B is a front perspective view of the sweep frame.

FIG. 17C is a top plane view of the sweep frame.

FIG. 17D is a side elevation view of the sweep frame.

FIG. 17E is a front elevation view of the sweep frame.

FIG. 17F is another perspective view of the sweep frame.

FIG. 18A is as a front perspective view of the sweep depth control arm assembly.

FIG. 18B is a rear perspective view of the sweep depth control arm assembly.

FIG. 18C is a top plan view of the sweep depth control arm assembly.

FIG. 18D is a side elevation view of the sweep depth control arm assembly.

FIG. 18E is a front elevation view of the sweep depth control arm assembly.

FIG. 19A is a perspective view of the sweep depth control handle.

FIG. 19B is a top plan view of the sweep depth control handle.

FIG. 19C is a side elevation view of the sweep depth control handle.

FIG. 19D is a front elevation view of the sweep depth control handle. I

FIG. 20A is an exploded perspective view of the sweep spindle and bushing assembly.

FIG. 20B is a side elevation view of the sweep spindle and bushing assembly.

FIG. 20C is an end elevation view of the sweep spindle and bushing assembly.

FIG. 20D is a sectional view of the sweep spindle and bushing assembly taken long lines D-D of FIG. 20B.

FIG. 21A is a perspective view of the sweep gauge wheel spindle.

FIG. 21B is a top plane view of the sweep gauge wheel spindle.

FIG. 21C is a side elevation view of the sweep gauge wheel spindle.

FIG. 21D is a front elevation view of the sweep gauge wheel spindle.

FIG. 21E is another perspective view of the sweep gauge wheel spindle.

FIG. 21F is another side elevation view of the sweep gauge wheel spindle.

FIG. 21G is a rear end view of the sweep gauge wheels spindle.

FIG. 21H is a view of the sweep gauge wheel spindle take along line H-H of FIG. 21F.

DETAILED DESCRIPTION OF THE INVENTION

Figure 2A:
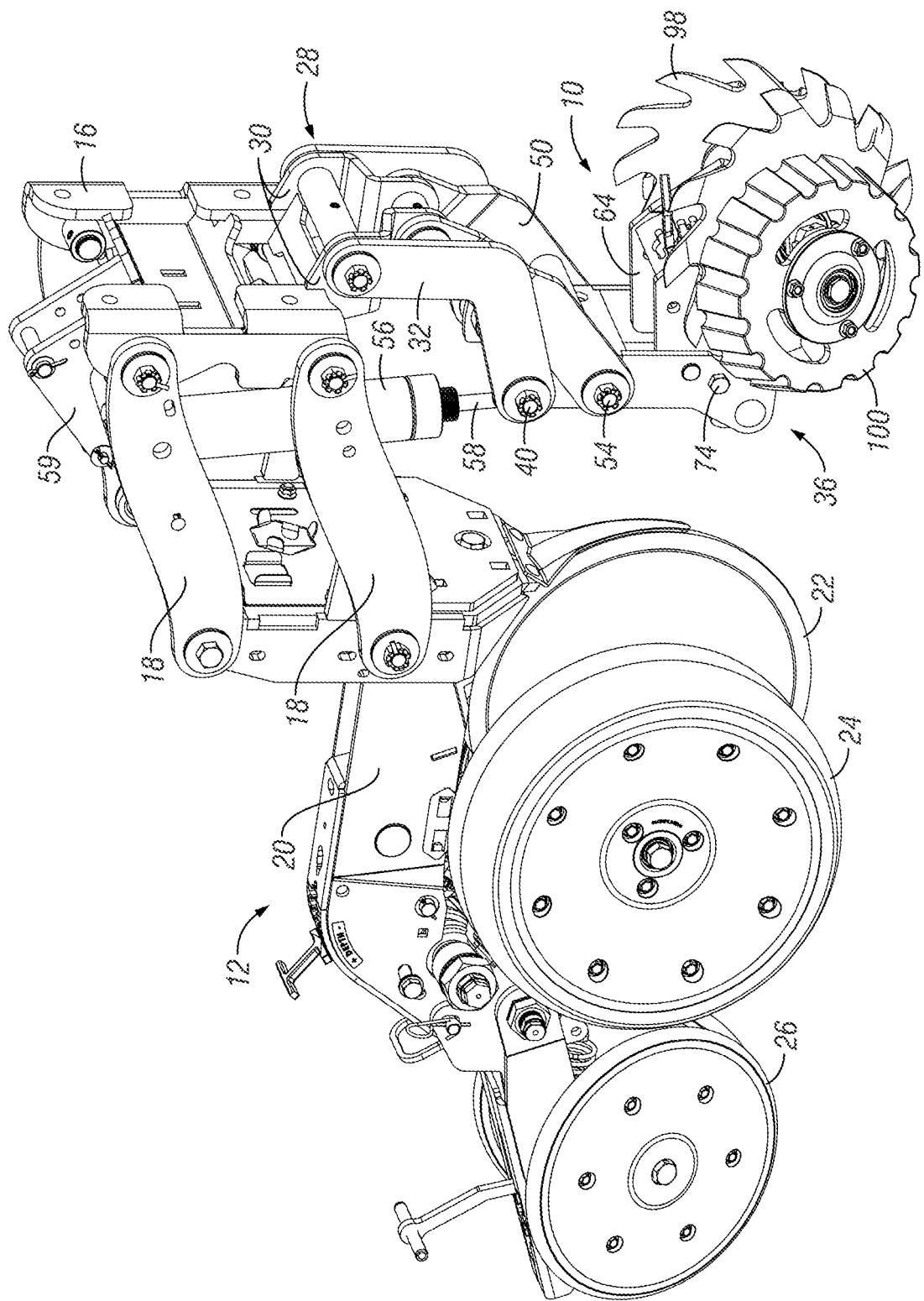
FIG. 2A is a perspective view of the planter row unit with the sweep in the lowered position.

The present invention is directed towards a ground engaging accessory or tool 10 used in conjunction with a planter row unit 12 mounted to a tool bar 14. The row unit 12 includes a front mounting bracket 16 for attached to the tool bar 14, parallel link arms 18, and a frame 20 to support a pair of disc openers 22, and pair of gauge wheels 24, and a pair of closing wheels 26. The frame 20 can be raised and lowered between transport and field positions by the hydraulic system of the tractor. While the accessory 10 of the present invention can be used on any row unit, the details of the row unit 12 shown in the drawings are described in detail in Applicant's published applications 2017/025,8002 and 2017/030,364, which are incorporated herein by reference in their entirety.

In the drawings, the accessory 10 is shown to be a sweep or cleaner for pushing aside debris in the field before seeds are planted. It is understood that the accessory may be other tools, such as fertilizer application tools, rolling baskets, coulters, cover crop rollers, and other types of residue removal tools, without departing from the scope of the present invention.

The accessory 10 is attached to the mounting bracket 16 of the row unit 12 so as to reside at the front of the row unit 12, substantially below the tool bar 14 and spaced forwardly from the disc openers 22. A bracket mount assembly 28 having a pair of spaced apart arms 30 is welded or otherwise fixed to the front mounting bracket 16 of the tool bar 12. A pair of L-shaped upper link arms 32 are pivotally mounted to the arms 30 of the mount assembly 28 via a pivot shaft 34. A receiver assembly 36 having a pair of spaced apart arms 38 is pivotally mounted to the lower rear ends of the link arms 32 by a pivot shaft 40 at the upper ends of the arms 38. The mounting of the link arms 32 on the shafts 34 and 40 includes a composite spacer or washer 42, a tapered bearing race 44, a tapered bushing 46, and a retainer nut 48 mounted on the threaded ends of the shafts 34, 40. The tapered bearing or bushing 46 and the race 44 are described in applicant's published patent application 2017/0261034, which is incorporated herein by reference in its entirety.

A pair of lower link arms 50 each have upper ends pivotally attached to the arms 30 of the mount assembly 28 via a pivot shaft 52, while the lower ends of the link arms 50 are pivotally attached to the arms 38 of the receiver assembly 36 using shafts 54. The pivotal mounting of the links arm 50 on the shafts 52, 54 also include washers, racers, tapered bushings, and nuts, similar to those described above with respect to the upper link arms 32 and shafts 34, 40.

A linear actuator, such as a hydraulic or pneumatic cylinder 56 with an extendible/retractable rod 58, is mounted between the row unit mounting bracket 16 and the receiver assembly 36. More particularly, the upper end of the cylinder 56 is pivotally attached to a pair of arms 60 welded or otherwise fixed to the mounting bracket 16 and extending rearwardly therefrom, while the lower end of the rod 58 is attached to a U-shaped plate 60 pivotally attached to the lower ends of the arms 38 of the receiver assembly 36 via bolts or pins 62, or similar pivotal fasteners. It is understood that the cylinder 56 and the rod 58 can be reversed, such that the rod is attached to the arms 59 and the cylinder 56 is attached to the plate 60. Also, the cylinder 56 and the rod 58 can be replaced with another linear actuator, such as a spring, or an electric actuator, without departing from the scope of the invention.

The accessory tool 10 includes a frame 64, as shown in FIGS. 17 A-F. The rear end of the frame 64 includes a pair of upper hooks 66 and a pair of lower hooks 68. The hooks are adapted to slide over and be retained on upper and lower shafts 70 and 72 extending between the arms 38 of the receiver assembly 36. A removable retention pin or bolt 74 can be inserted through holes in the arms 38 so as to be positioned immediately above the lower hooks 68, and thereby prevent the accessory tool 10 from being removed or detached from the receiver assembly 36.

Figure 9:
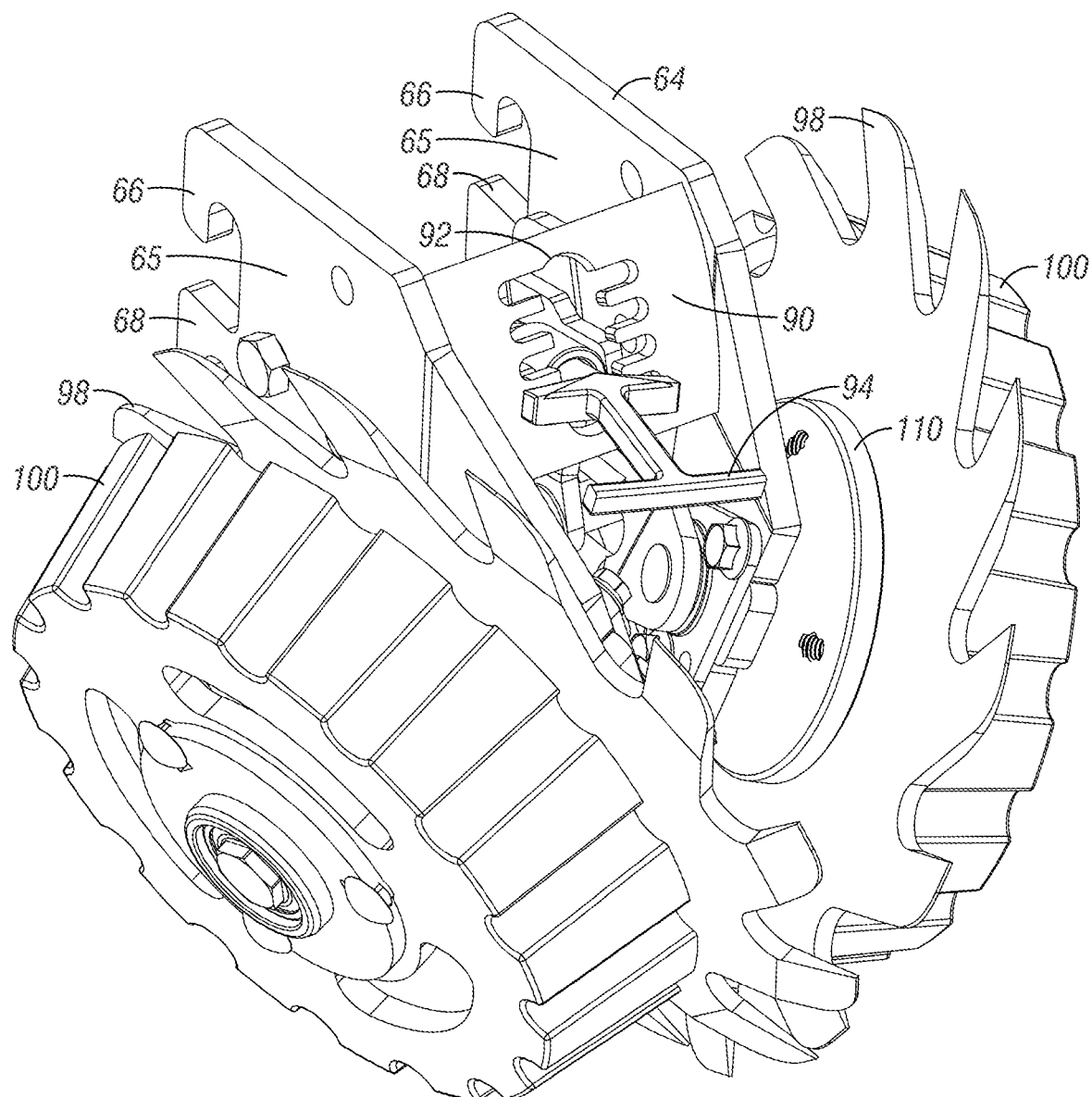
FIG. 9 is a front perspective view of the sweep.
Figure 10:
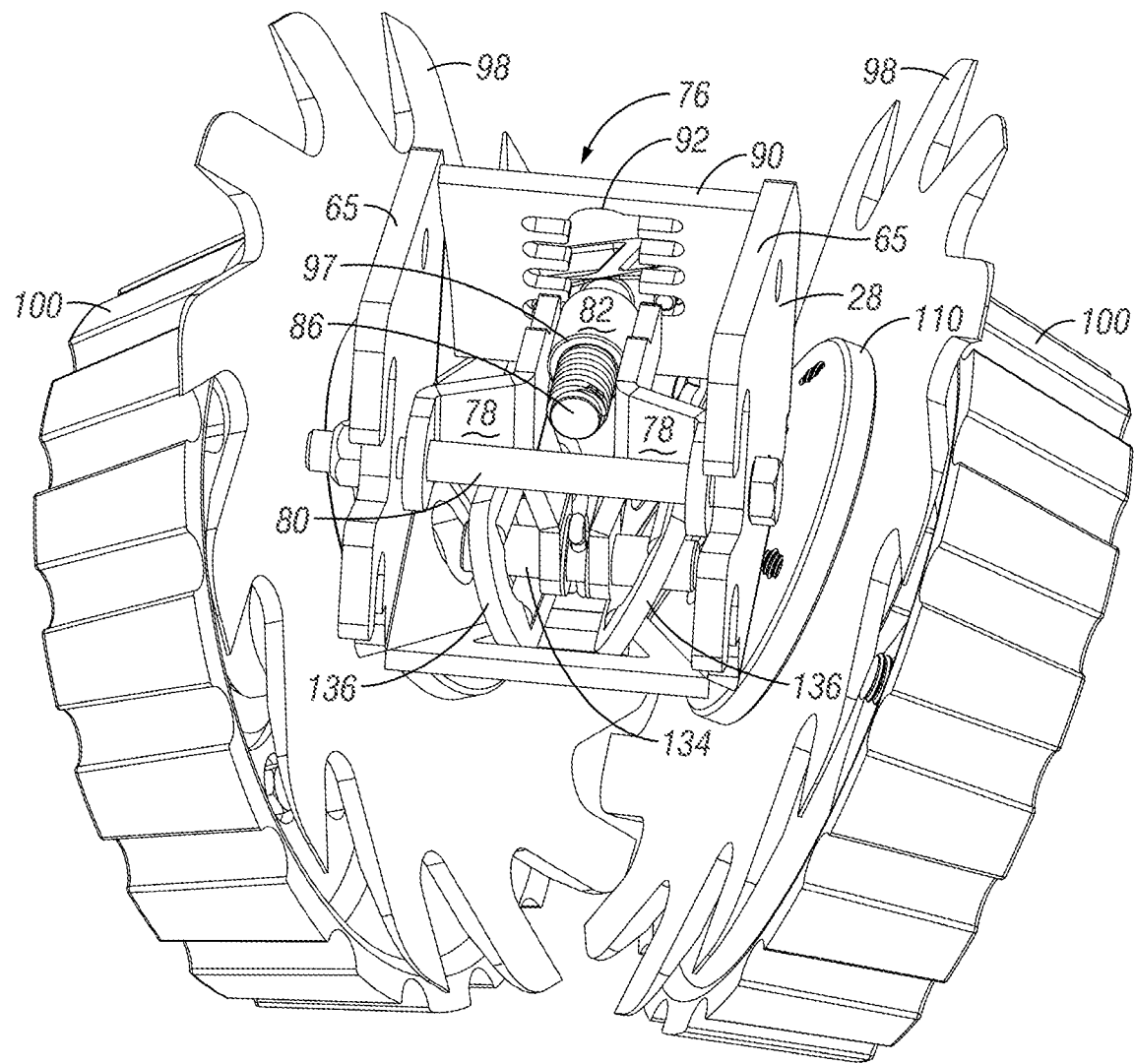
FIG. 10 is a rear perspective view of the sweep.

A depth control assembly 76 is mounted within the frame 64. The depth control assembly 76 includes left and right arms 78, as shown in FIGS. 18A-E. The depth control assembly 76 is pivotally mounted between the left and right plates 65 of the frame via a pivot bolt 80, as best shown in FIGS. 7 and 10. A tubular collar 82 is welded or otherwise fixed between the arms 78. A depth control handle 84, shown in FIGS. 19A-D, includes a rearwardly extending post 86 which extends through the collar 82 and retained in any convenient manner, such as by a snap ring 83 (FIG. 7) received in a groove 88 on the post 86. A curved plate 90 is welded between the plates 65 of the frame 64 and includes a central notch 92 with laterally extending fingers, as best seen in FIG. 9. The T-grip 94 of the handle 84 resides in front of the plate 90, with the post 86 extending rearwardly through the slot 92 and through the collar 82. The handle 94 includes rearwardly extending buttons or tabs 96 which can be selectively positioned in a pair of the fingers of the notch 92 so as to adjust the depth of the frame 64 of the accessory tool 10. A spring 97 (FIG. 7) on the rear end of the post 86 retains the handle 84 in a selected position along the plate 90 by biasing the buttons into the fingers of the notch 92.

Figure 3:
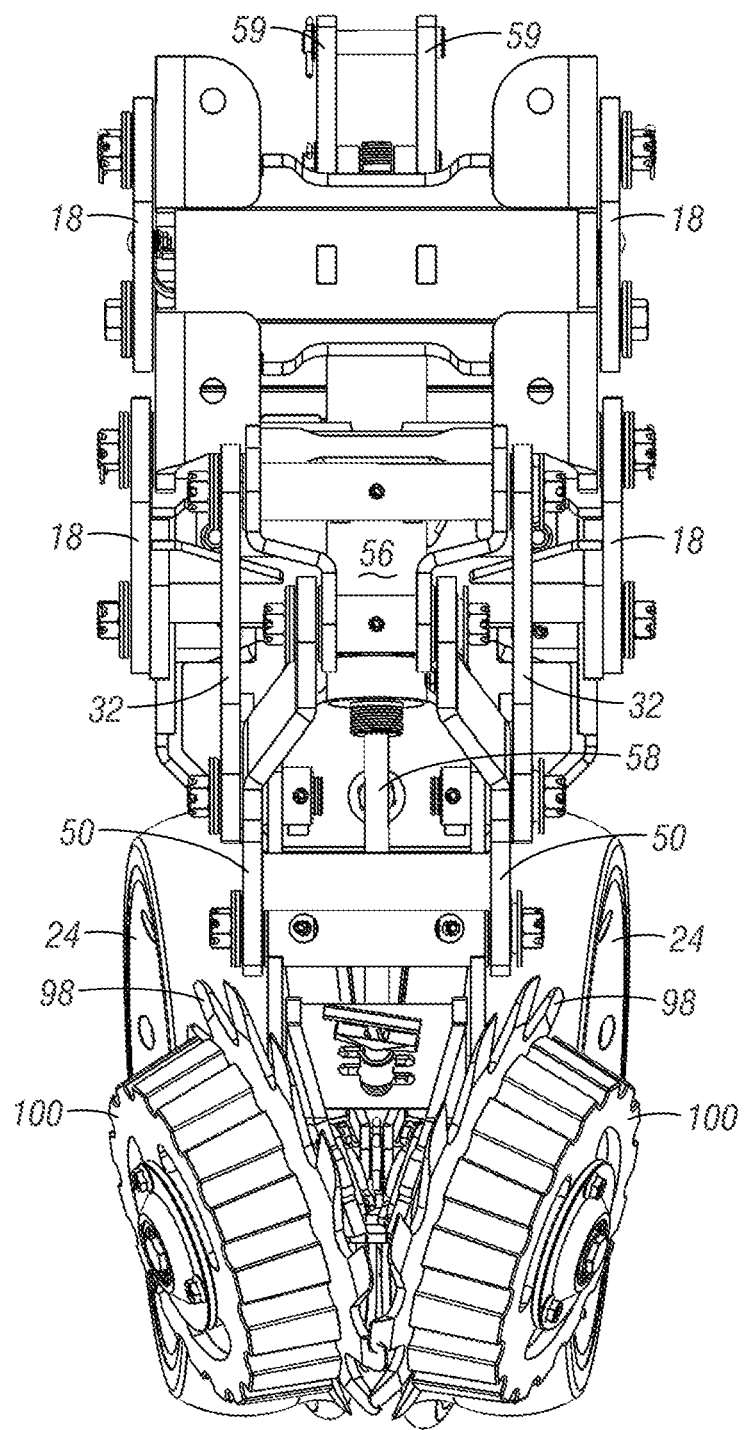
FIG. 3 is a front elevation view of the row planter and sweep in the lowered position.
Figure 4:
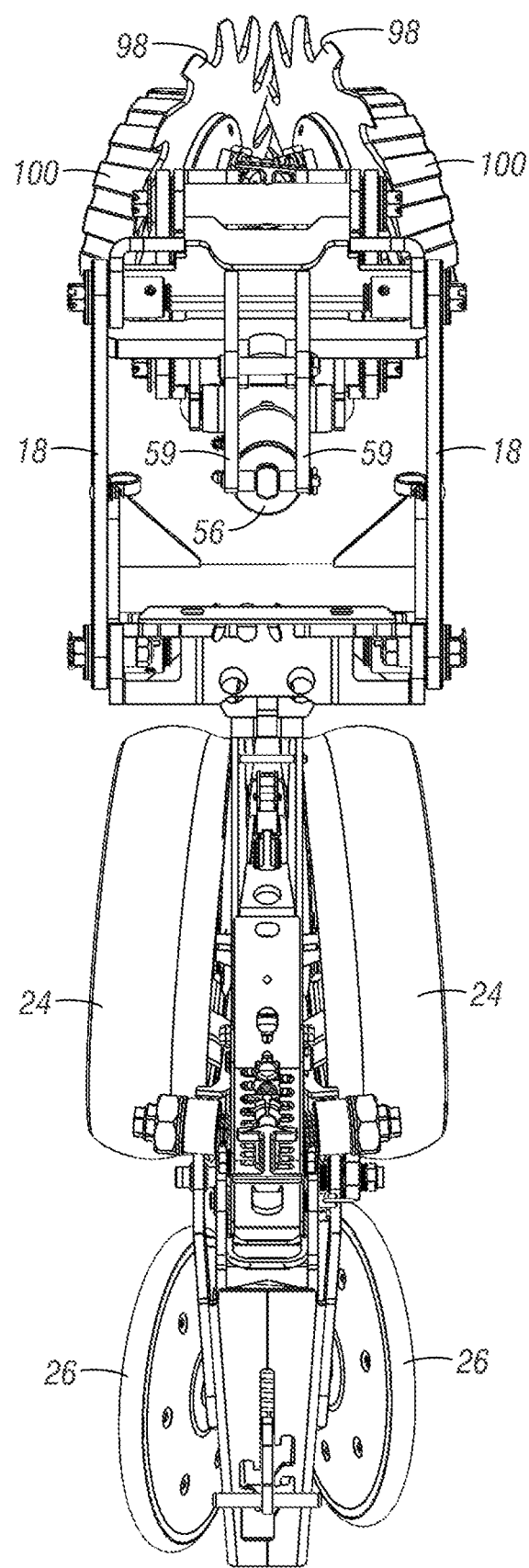
FIG. 4 is a top plan view of the row unit and sweep in the lowered position.
Figure 6A:
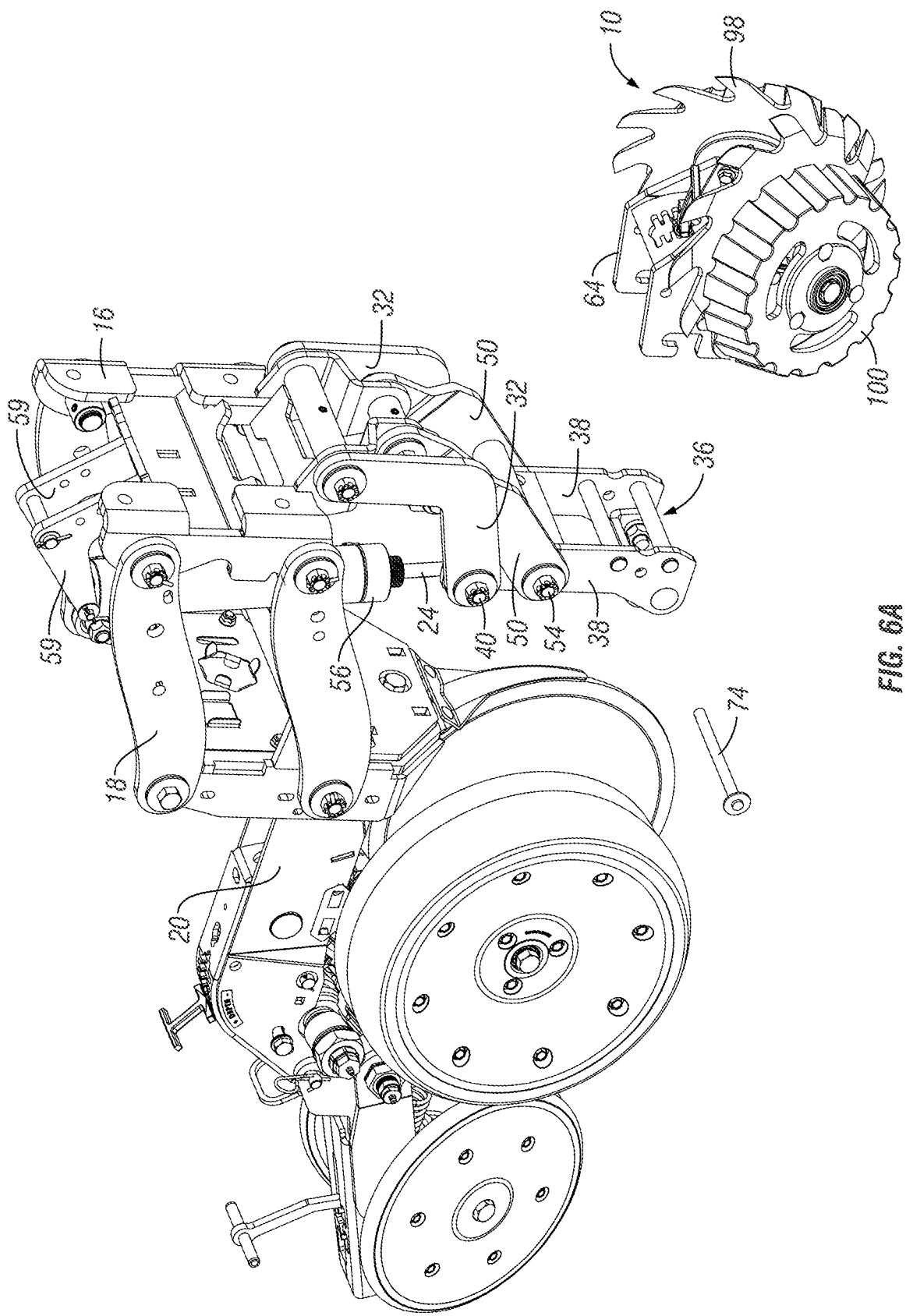
FIG. 6A is a partially exploded view of the row unit and sweep.
Figure 11:
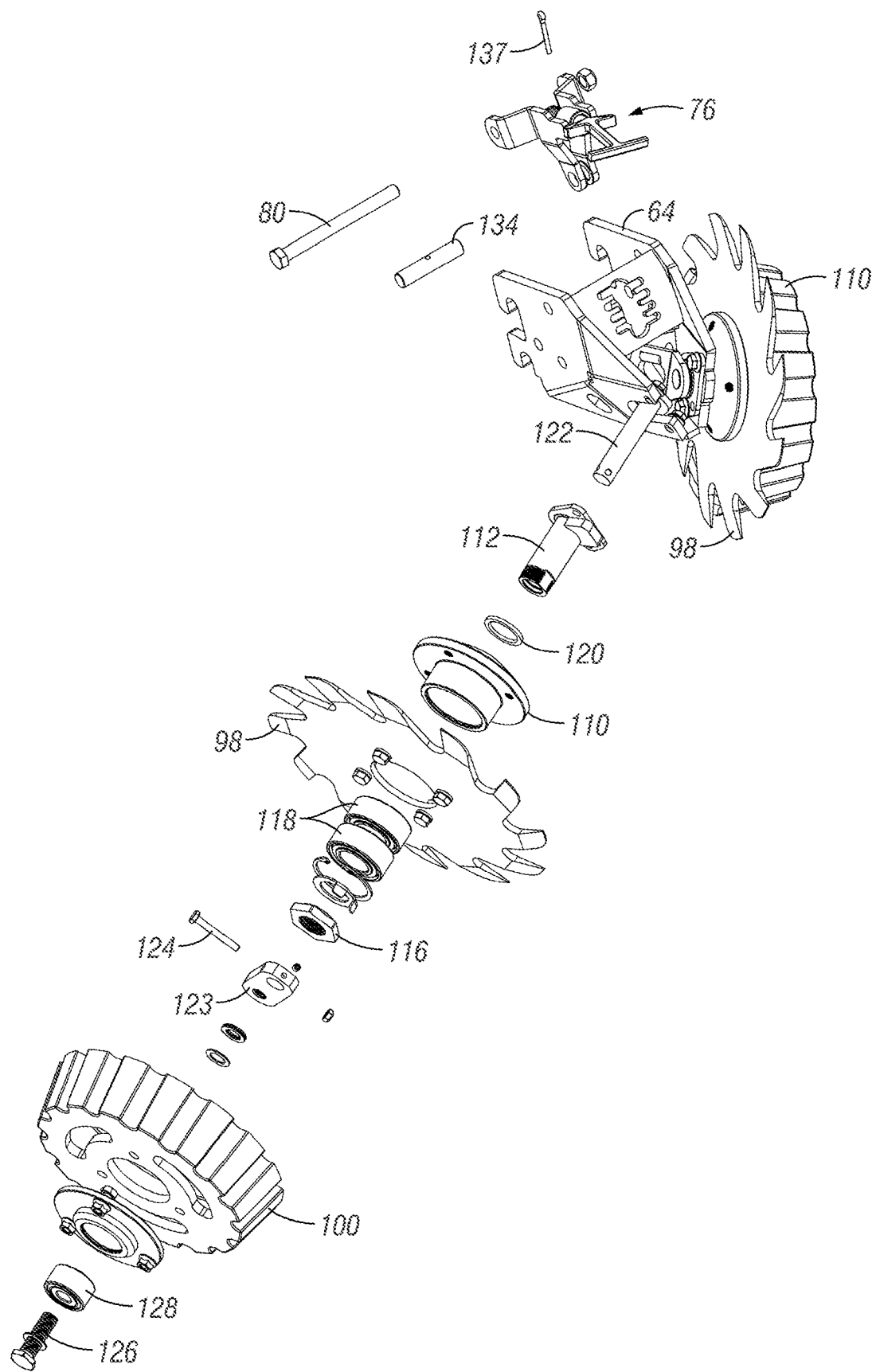
FIG. 11 is a partially exploded view of the sweep.
Figure 12:
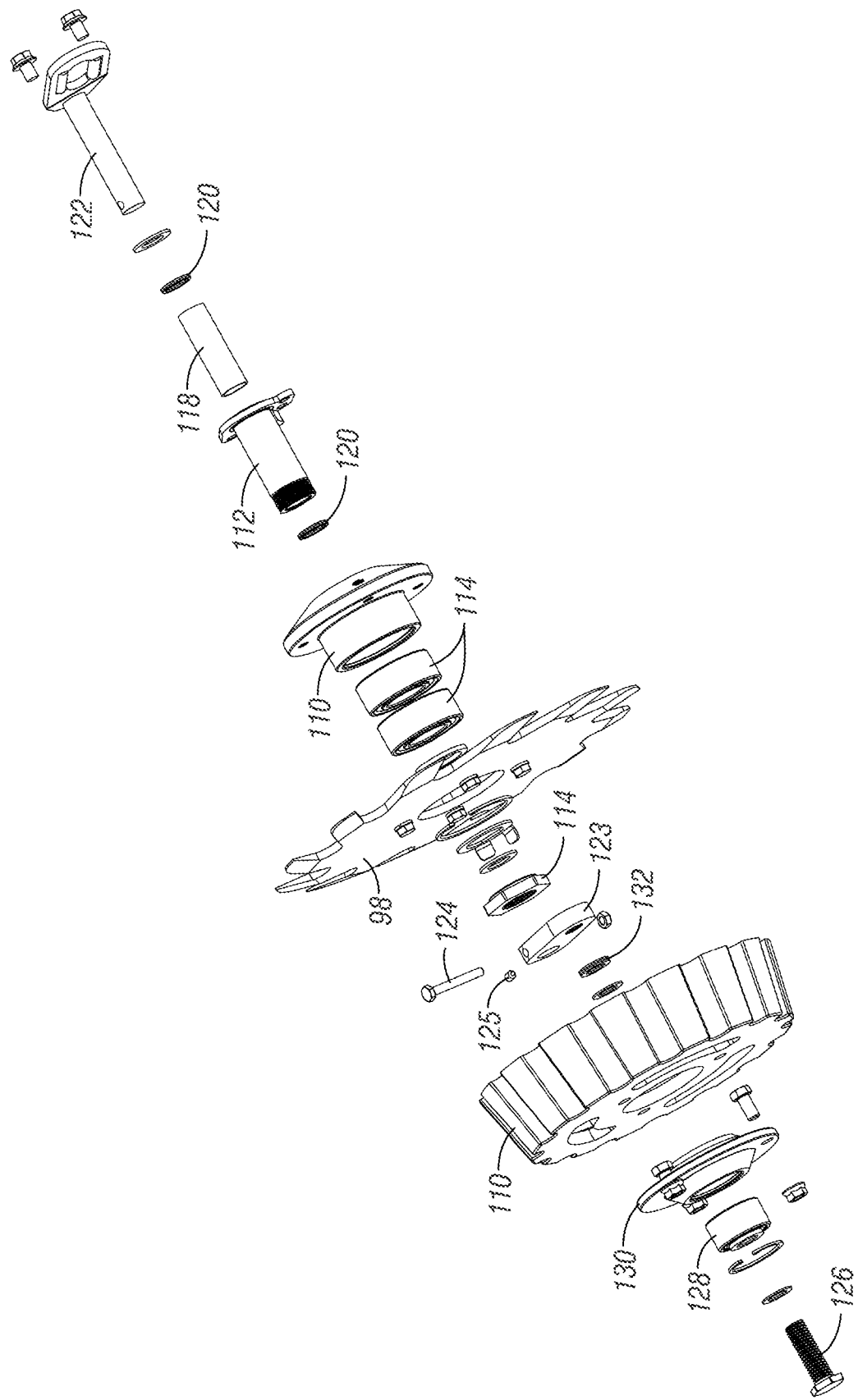
FIG. 12 is an exploded view of one of the sweep gauge wheels and discs.

The accessory tool 10 shown in the drawings is a sweep or cleaner used to remove debris on the ground prior to planting, such as the crop residue resulting from no-till farming. The sweep or cleaner includes a pair of discs 98 and a pair of gauge wheels 100 which are rotatably mounted in canted orientations on the left and right sides of the tool 10, as best seen in FIG. 3. The left and right discs 98 and the wheels 100 are mounted in similar manners, on each side of the tool 10. As seen in FIGS. 11 and 12, each disc 98 is mounted on a hollow hub 110 and a spindle 112. More particularly, the spindle 112 extends through the hub 110 into a pair of bushings 114 and is retained by a nut 116 on the threaded end of the spindle 112. The interior of the spindle 112 is lined with a composite bushing 118, with a dust seal 120 mounted within the spindle 112 at each end. The bushing 118 and seals 120 are described in Applicant's copending patent application Ser. No. 15/896,225 filed on Feb. 14, 2018 and which is incorporated herein by reference in its entirety.

The depth control spindle 122 (FIGS. 21A-I) extends through the hollow disc spindle 112, through the bushings 114, and through the nut 116. The end of the spindle 122 extends into a gauge wheel depth control adjustment arm 123 and is secured by a bolt 124 extending through a hole in the end of the spindle 122 and a nut. The gauge wheel 100 is attached to the adjustment arm 123 by a retention bolt 126, which extends through a bearing 128 mounted in a gauge wheel hub 130 which is bolted or otherwise attached to the gauge wheel 100. A set screw 125 (FIGS. 12-14) extends through the arm 123 and into a recess in the end of the spindle 122, to eliminate or minimize movement and wear in the spindle 122 relative to the arm 123. Preferably, the inner end of the set screw 125 and the recess or pilot hole in the spindle 122 having mating coned shapes. Shim washers 132 may be provided between the adjustment arm 122 and the gauge wheel hub 130.

Figure 8B:
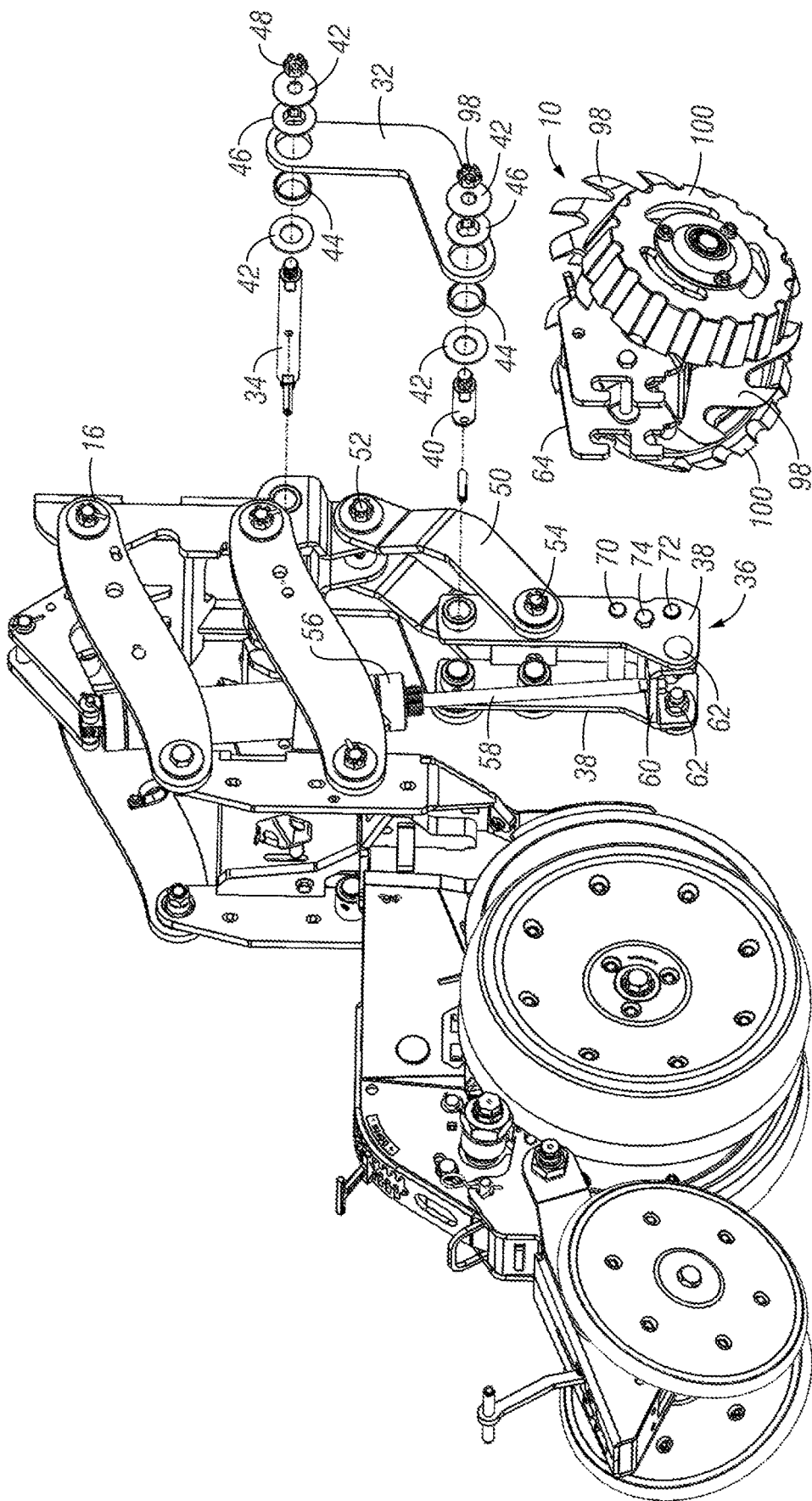
FIG. 8 is a front perspective view of the sweep, with a portion of the frame hidden for clarity.
Figure 8:
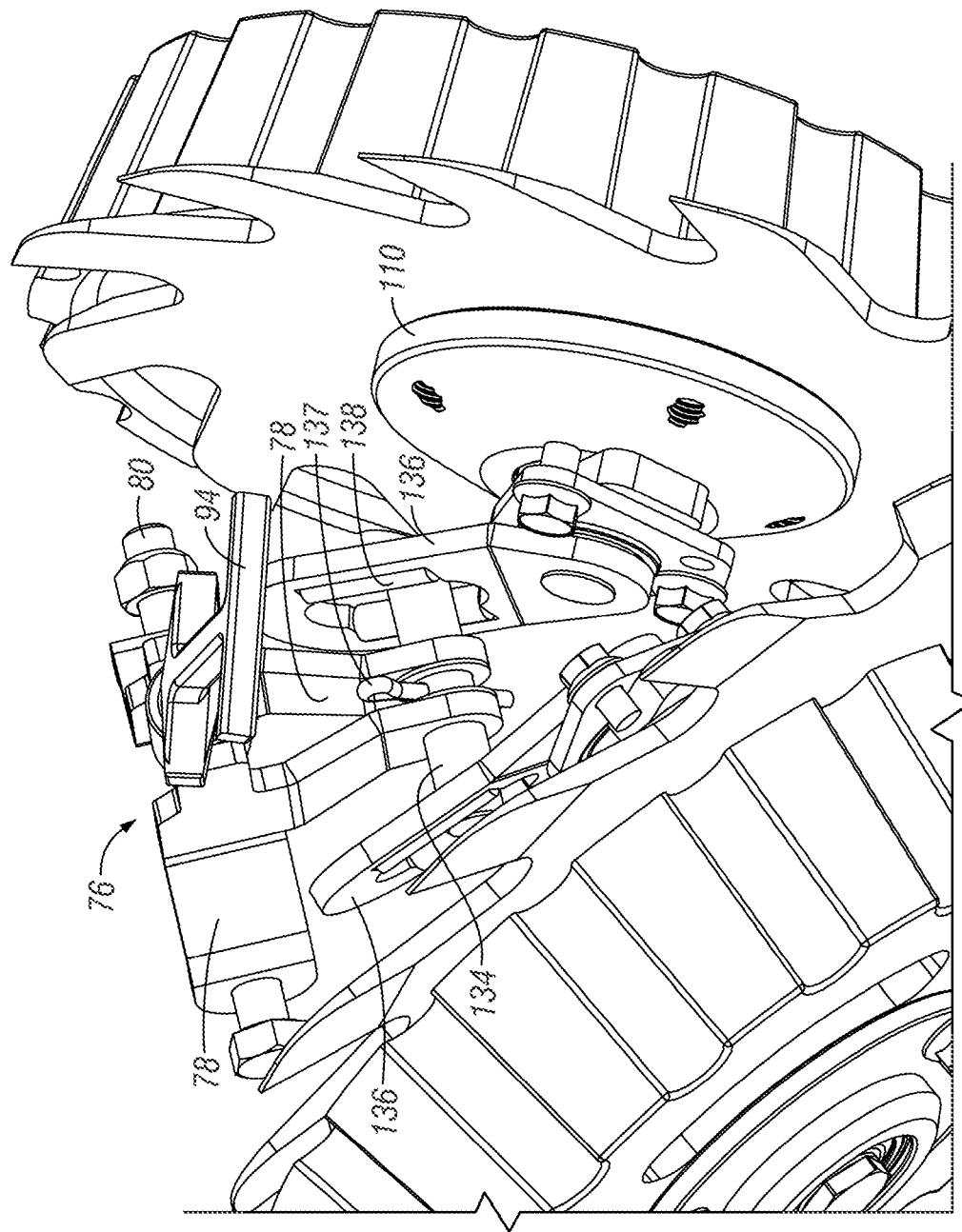
Figure 13:
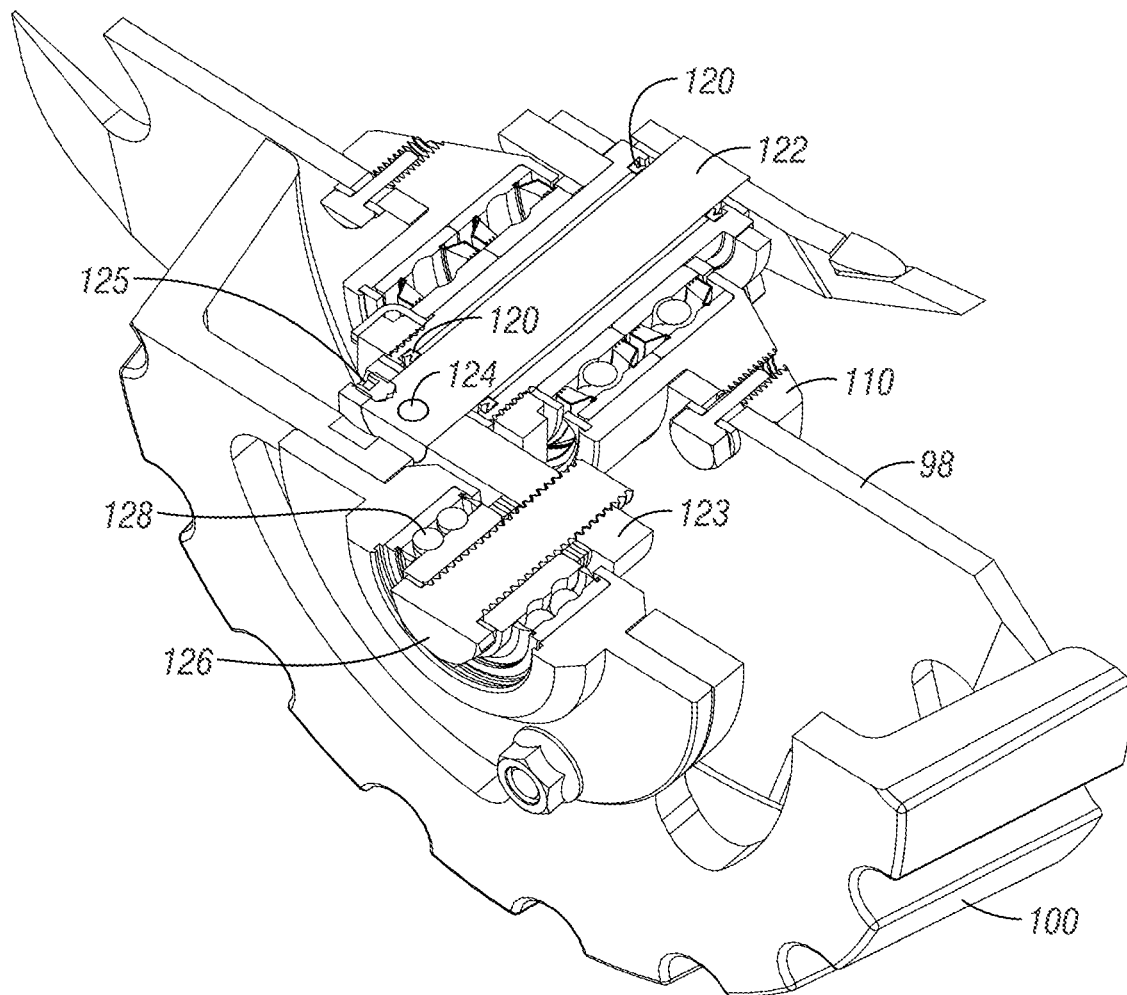
FIG. 13 is a sectional view of the sweep gauge wheel and the disc as mounted on the sweep.
Figure 14:
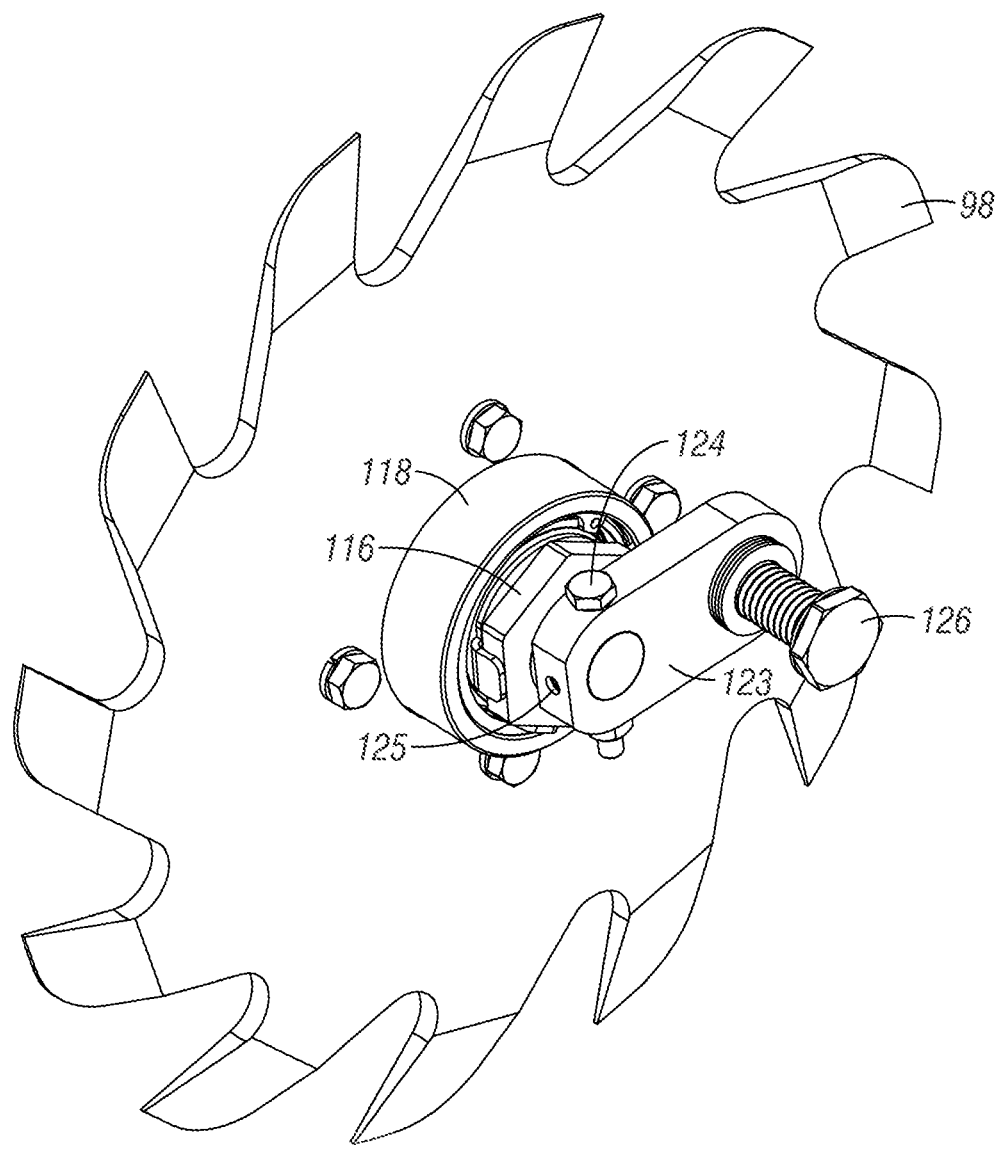
FIG. 14 is a perspective view of the exterior side of one of the sweep discs, with the gauge wheel hidden for clarity.
Figure 15:
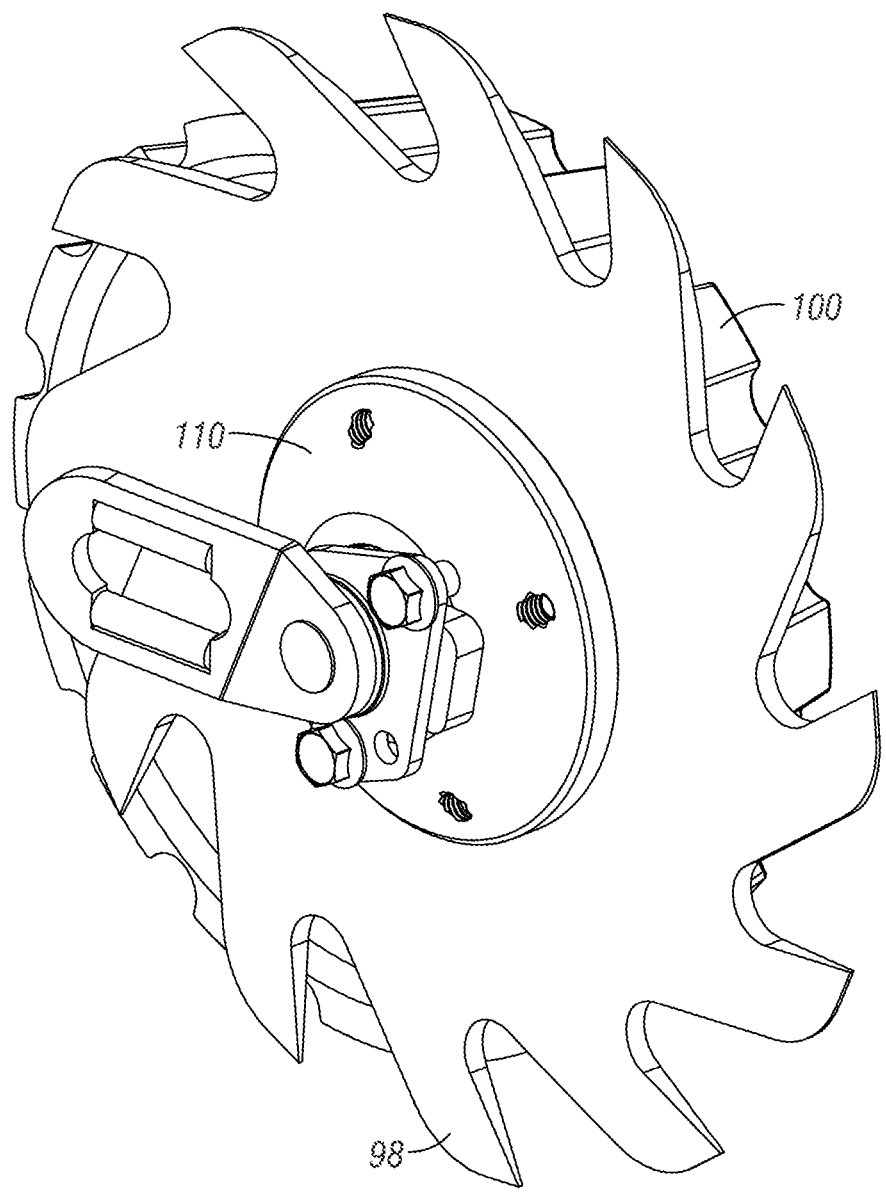
FIG. 15 is a perspective view of the interior side of one of the sweep discs.
Figure 16:
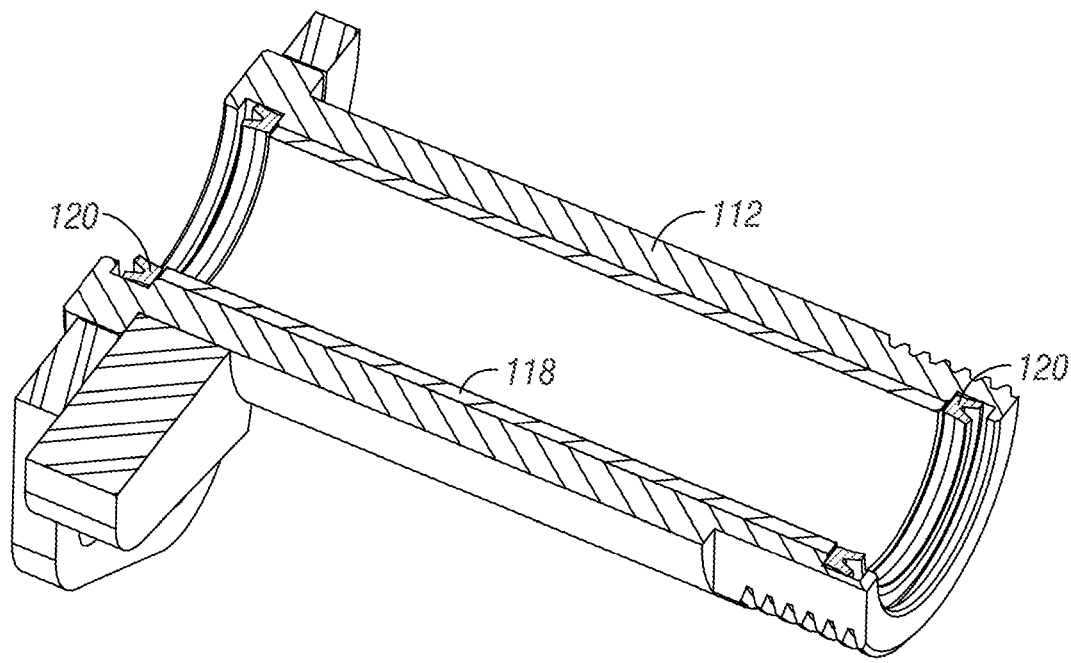
FIG. 16 is a sectional view of the sweep disc spindle and bushing assembly.
Figure 17A:
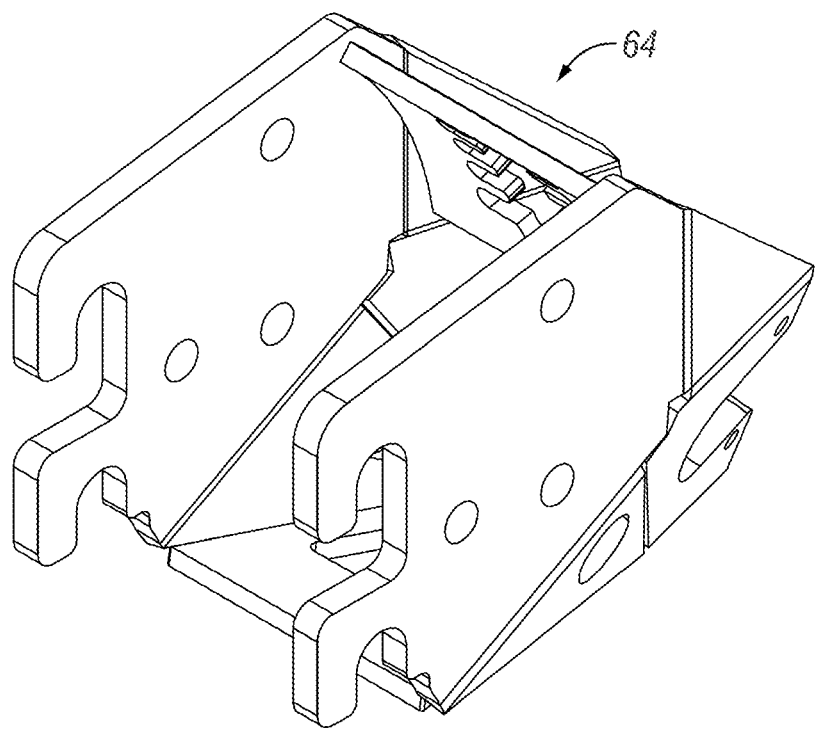
FIGS. 17A-F are various views of the sweep frame.
Figure 17B:
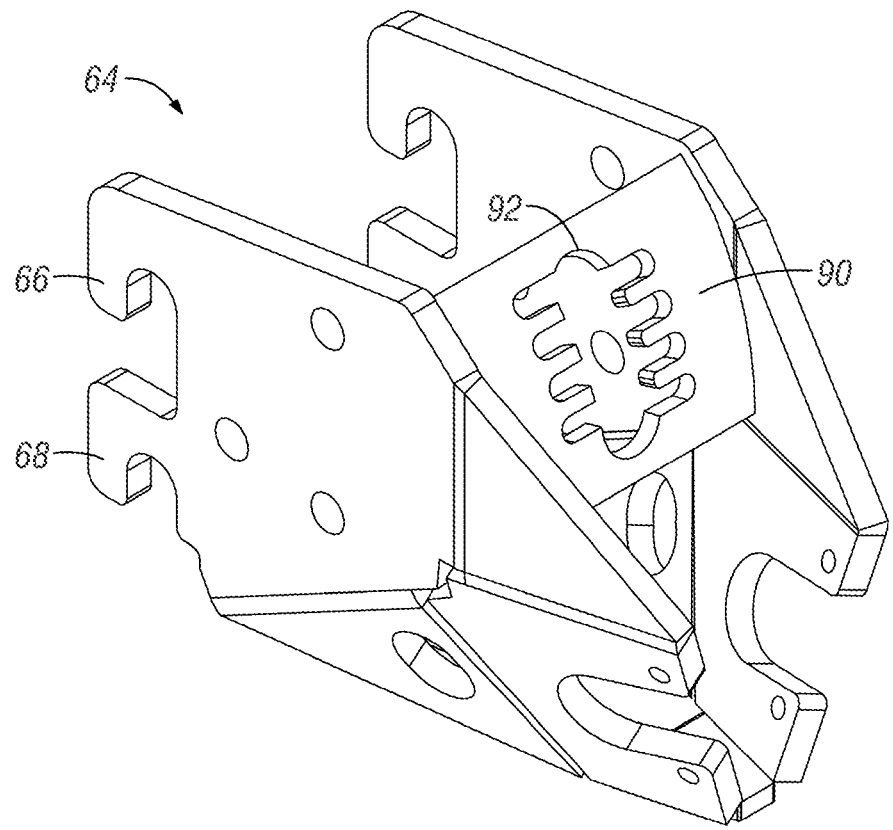
Figure 17C:
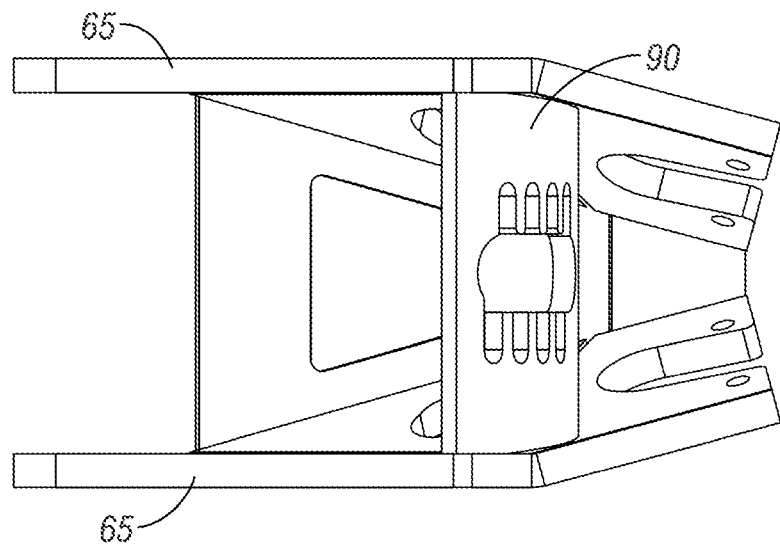
Figure 17D:
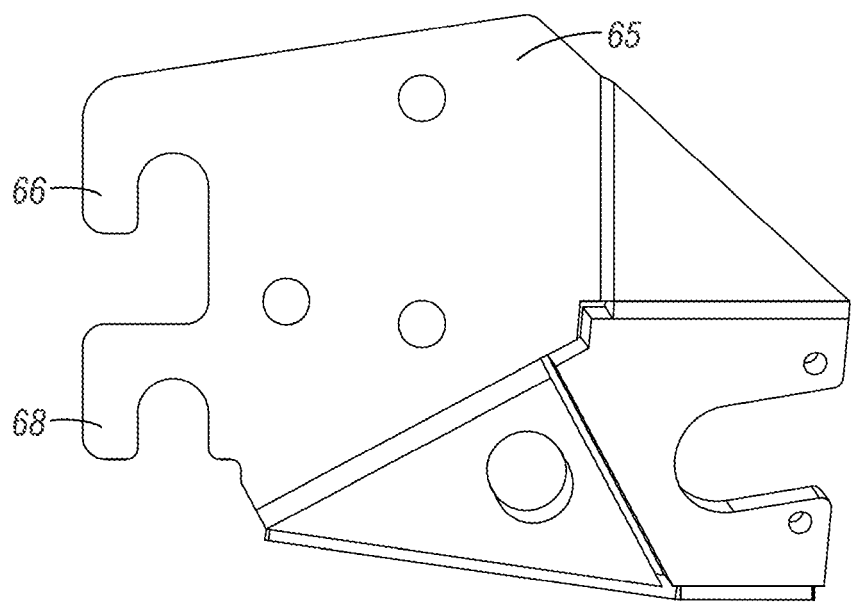
Figure 17E:
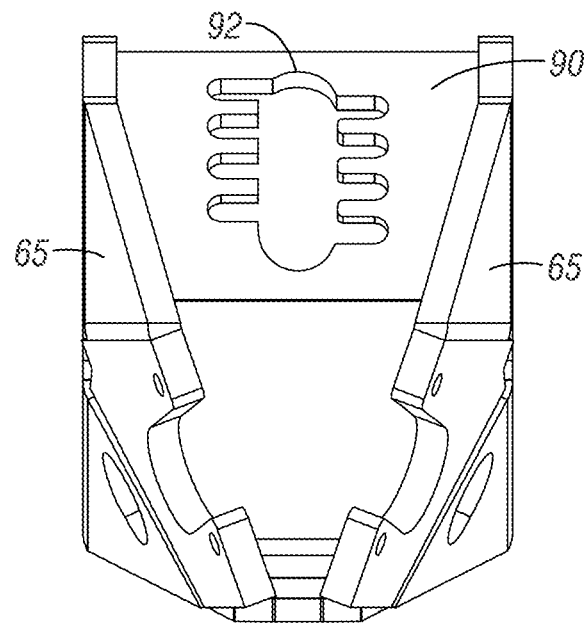
Figure 17F:
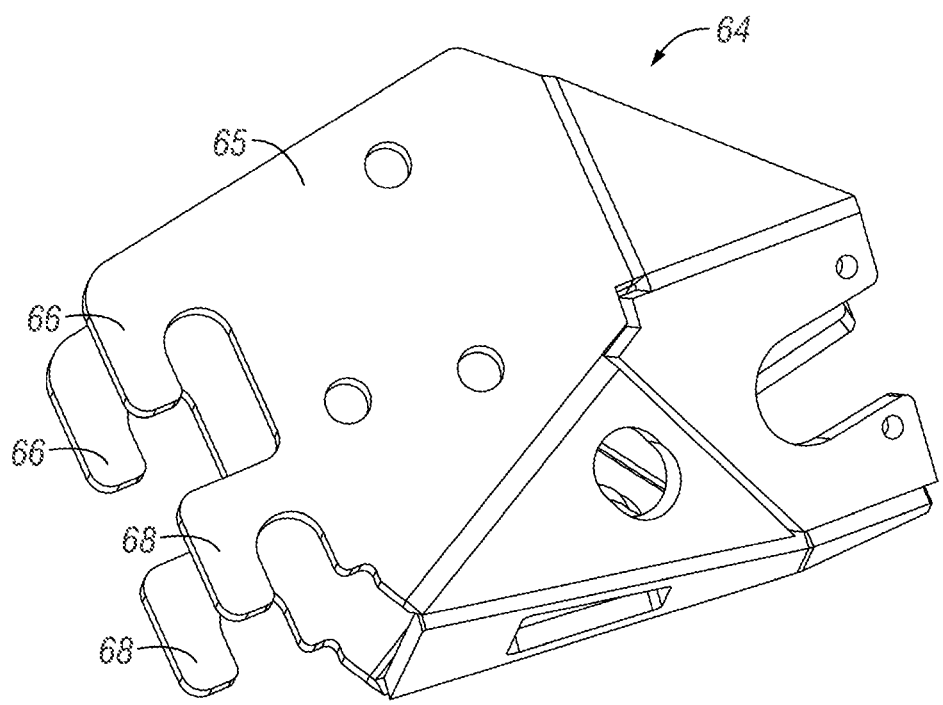
Figure 18A:
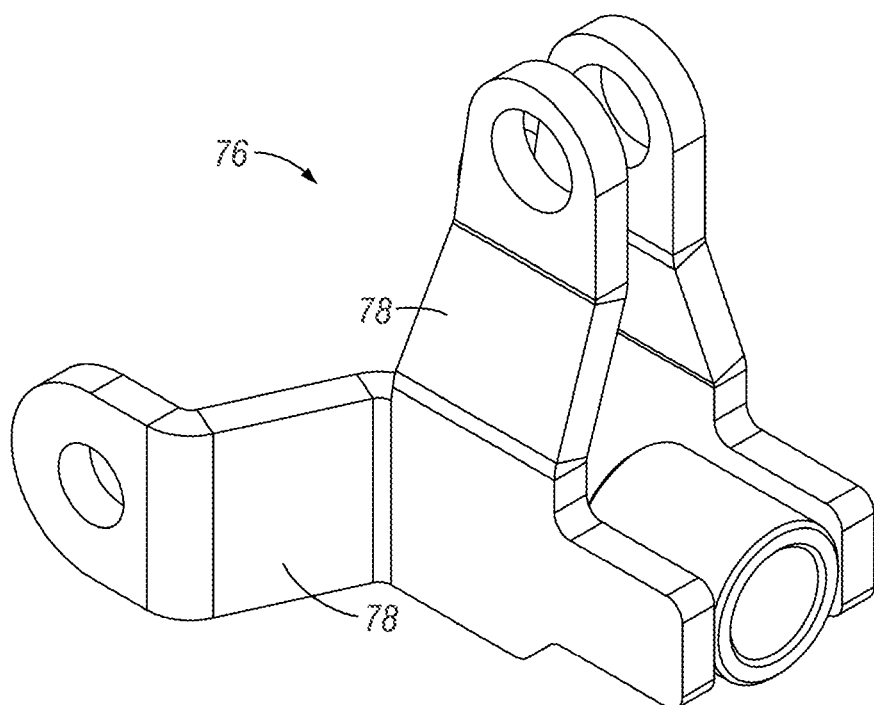
FIGS. 18A-E are various views of the sweep depth control arm assembly.
Figure 18B:
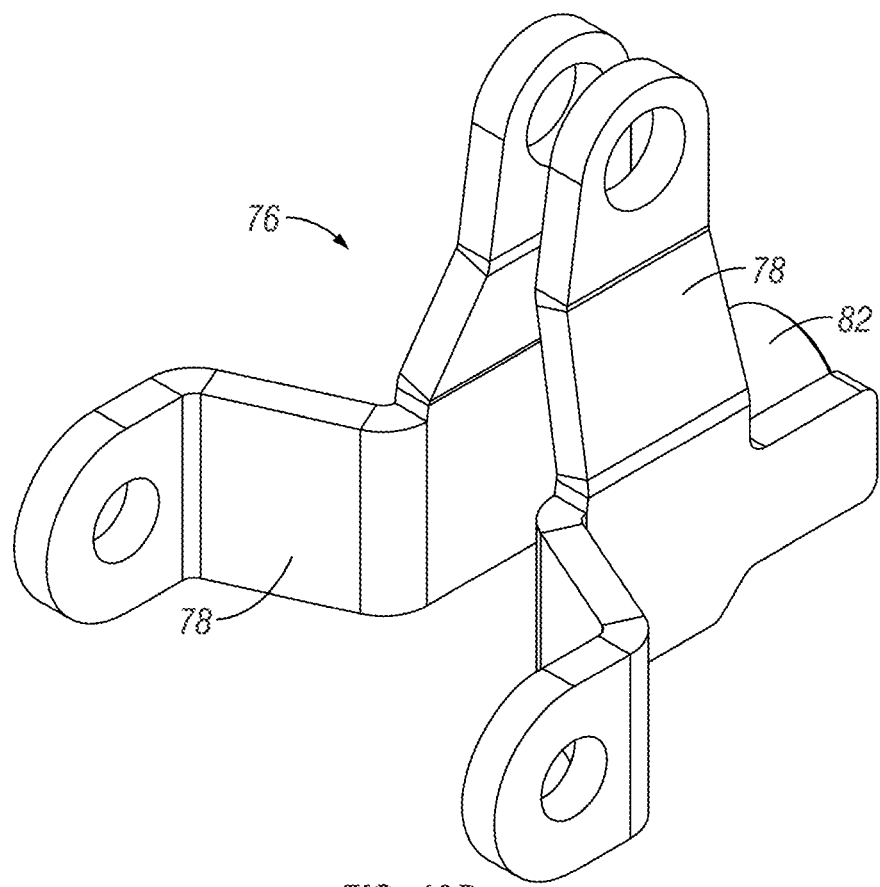
Figure 18C:
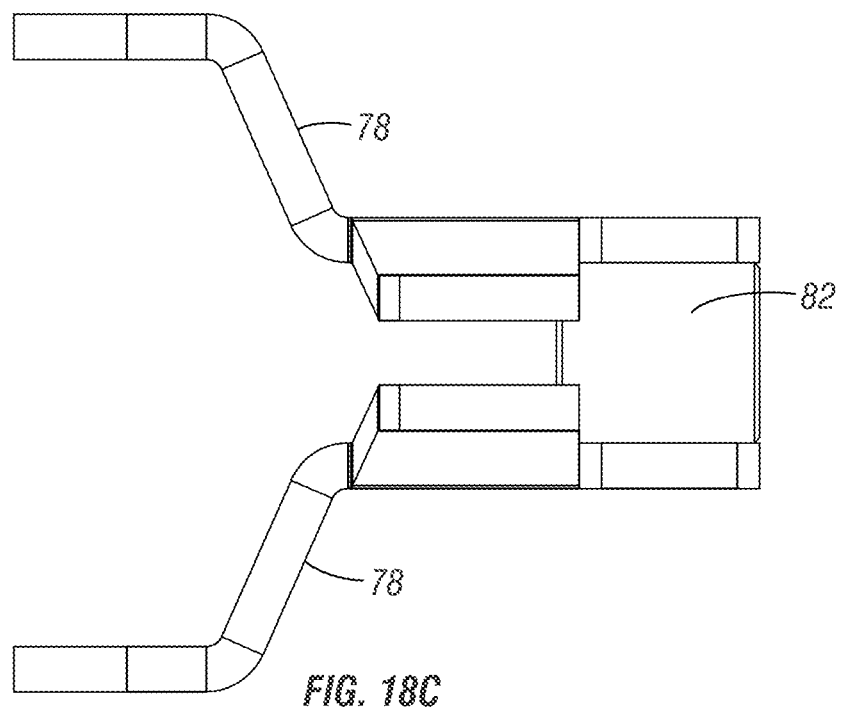
Figure 18D:
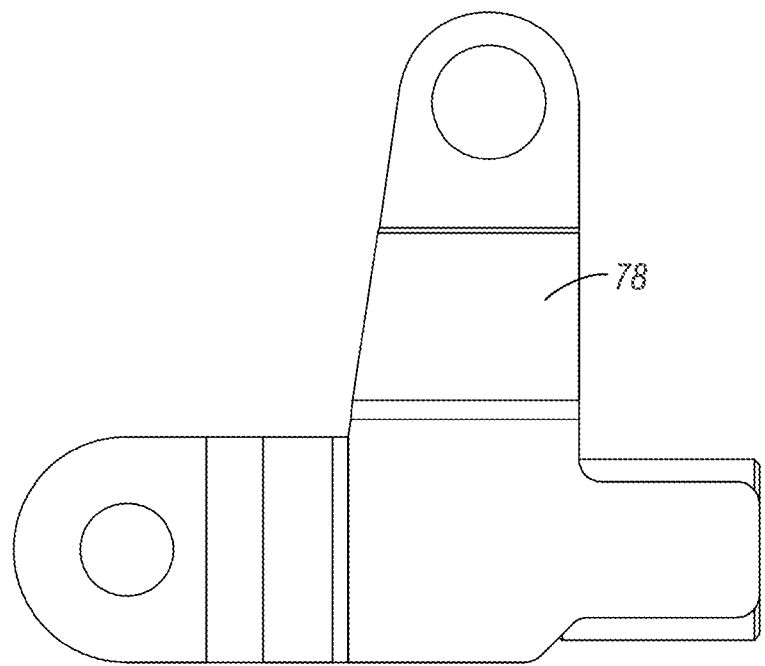
Figure 18E:
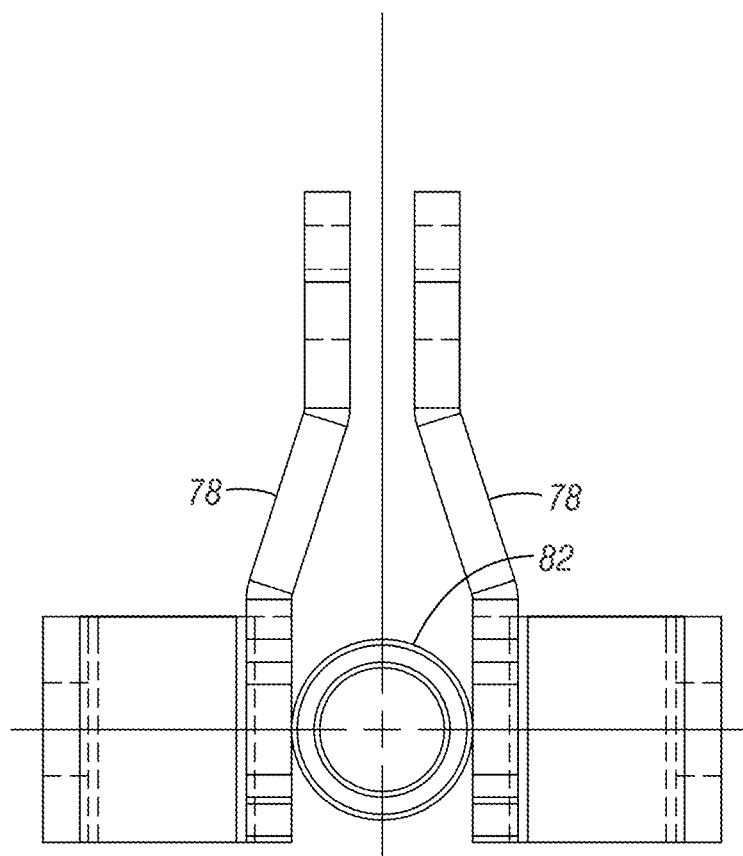
Figure 19A:
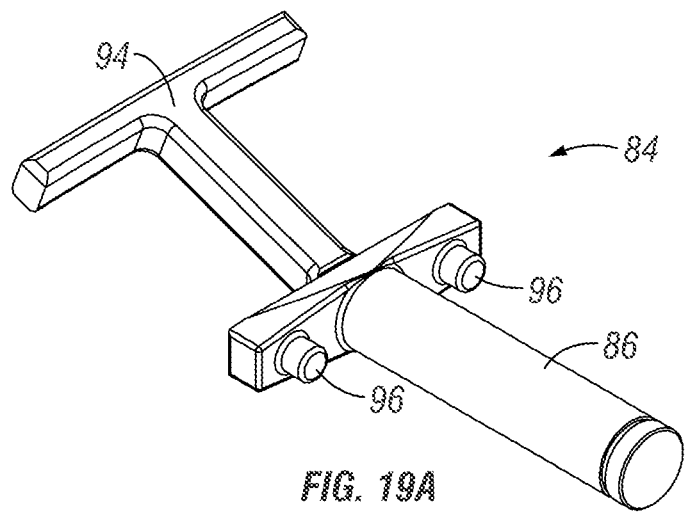
FIGS. 19A-D are various views of the sweep depth control handle.
Figure 19B:
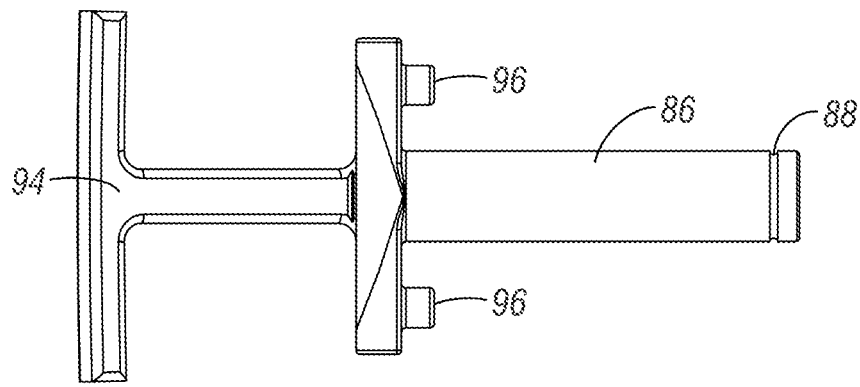
Figure 19C:
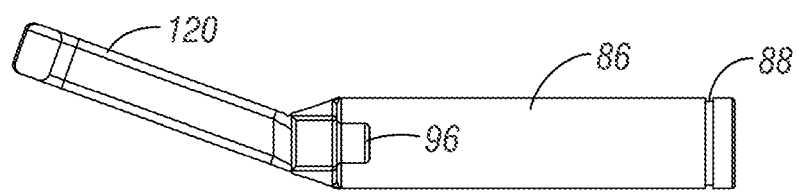
Figure 19D:
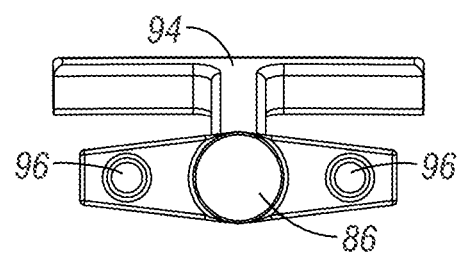
Figure 20A:
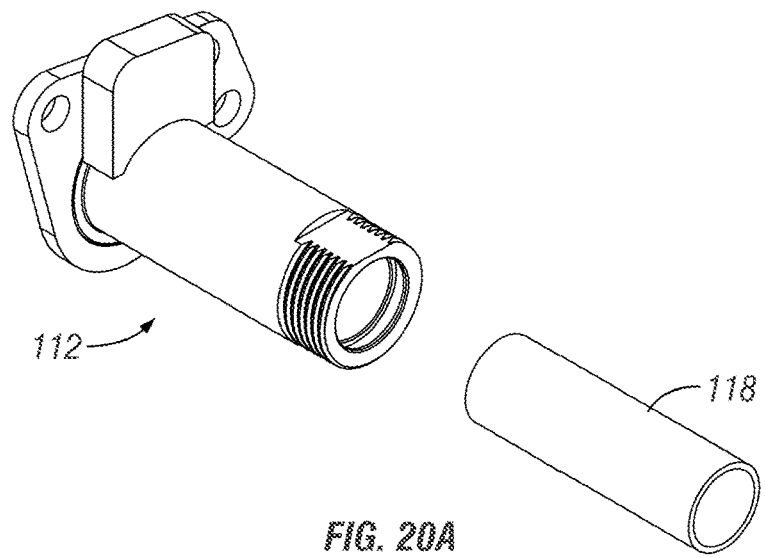
FIGS. 20A-D are various views of the sweep spindle and bushing assembly.
Figure 20B:
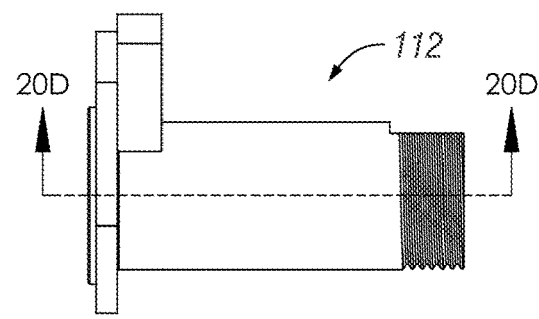
Figure 20C:
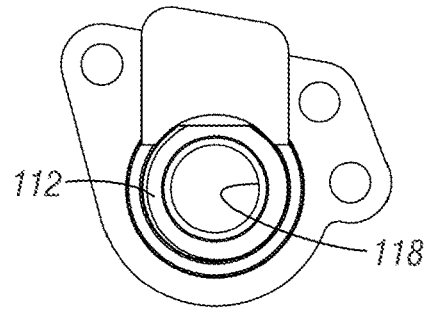
Figure 20D:
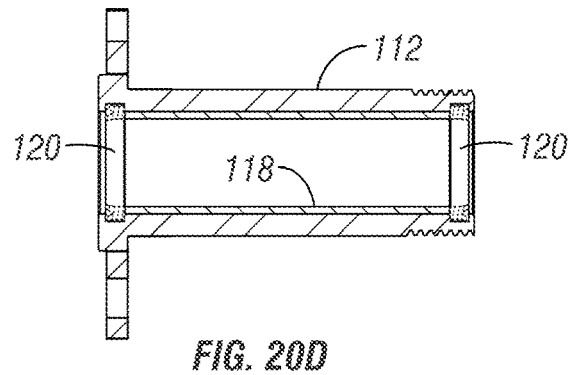
Figure 21A:
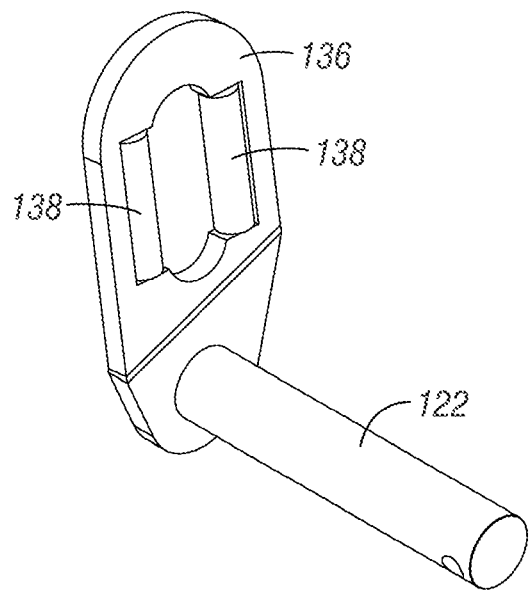
FIGS. 21A-H are various views of the sweep gauge wheel spindle.
Figure 21B:
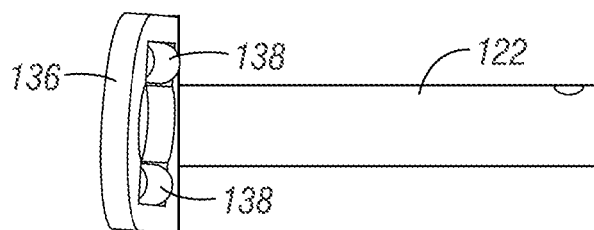
Figure 21C:
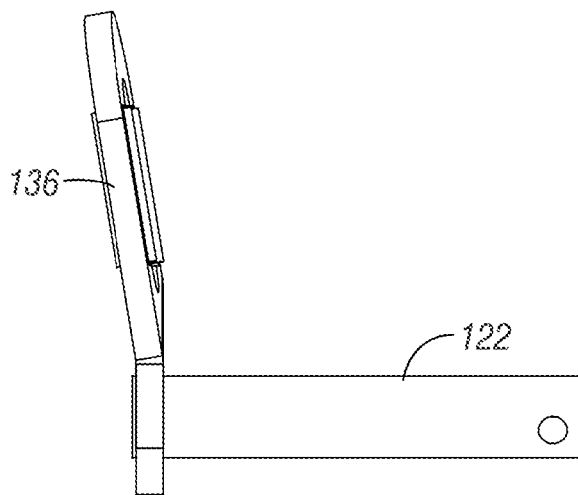
Figure 21D:
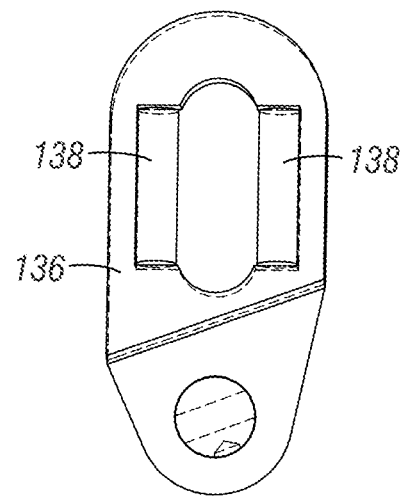
Figure 21E:
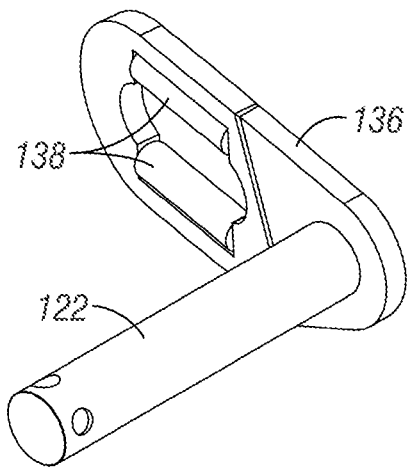
Figure 21F:
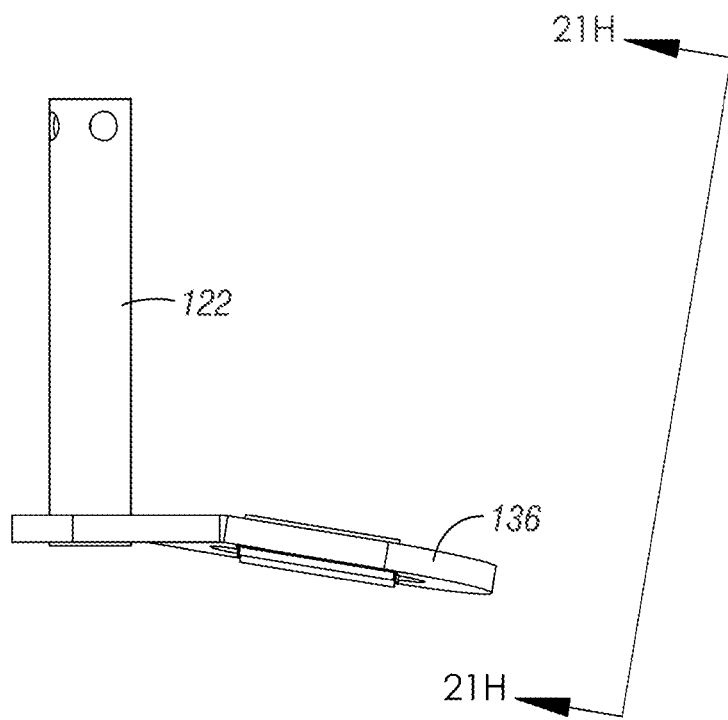
Figure 21G:
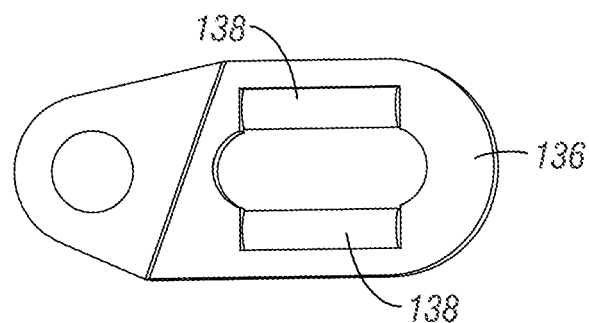
Figure 21H:
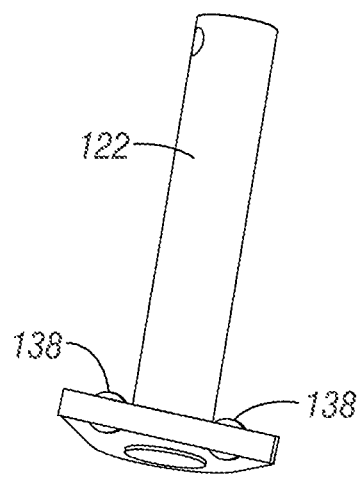

As seen in the sectional view of FIG. 13, the gauge wheel retention bolt 126 is offset from the disc spindle 112. Thus, the rotational axles of the disc 98 and the gauge wheel 100 are offset, rather than being co-linear. Thus, the depth of the gauge wheel 100 can be adjusted relative to the disc 98 by turning the spindle 122 clockwise or counterclockwise. Such rotation of the spindle 122 is controlled by a depth control slider rod 134 which extends through the lower arms 78 of the depth control assembly 76 and through slots in the arm 136 extending from the spindle 122, as shown in FIG. 8. A cotter pin 137 retains the slider rod 134 in the arms 78. The opposite sides of the arm slots are provided with a curved surface, such as a rod 138 welded to the arm 134 to minimize friction with the depth control rod 134.

As shown in FIGS. 21A-D, the arm 136 includes compound angles, such that the depth control rod 134 can move along the slots in the arms 136 without binding, as the depth control assembly is adjusted via the T-grip 94 of the handle 84.

Figure 2B:
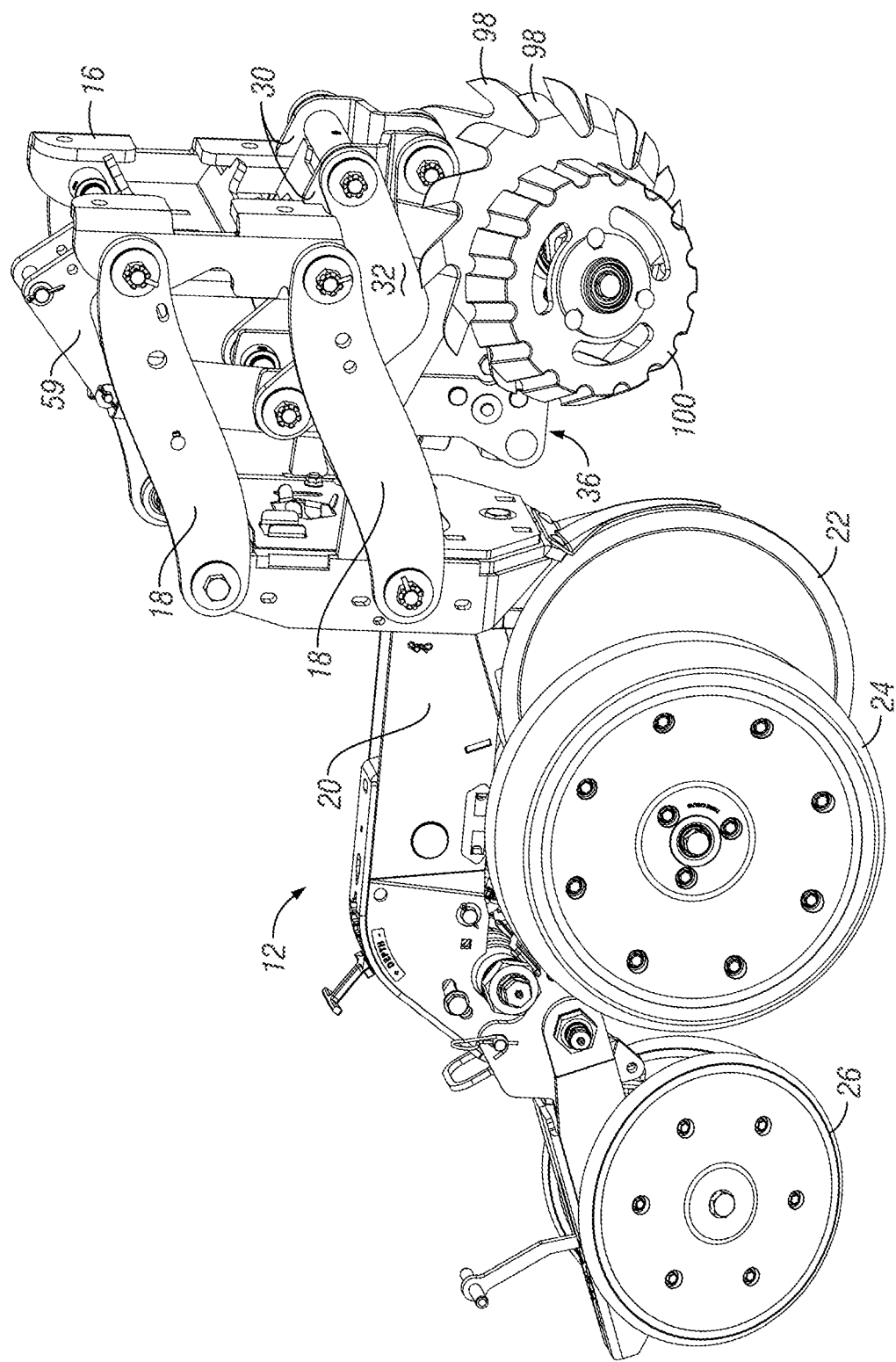
FIG. 2B is a view similar to FIG. 2A, with the sweep in the raised position.

In use, the accessory 10 can be quickly and easily attached and detached to the row unit 12 via the hooks 66, 68 of the frame 64, and the retention pin 74. The rod 58 of the cylinder 56, or other linear actuator, can be extended and retracted for movement between the lowered position, shown in FIGS. 1A and 2A, and the raised position shown in FIGS. 1B and 2B, by controls in the tractor cab and the hydraulic system of the tractor. The desired down/up pressure is controlled by the toolbar control computer, located in the tractor cab. Cylinder pressure is displayed on the control computer screen and is adjusted with by selecting the touch screen mode selector button and then turning a rotary knob to adjust the pressure up/down. This system also has the ability to automatically maintain the desired down/up pressure on the cylinder but can quickly be over-ridden to a manual mode, by pressing the rotary knob and adjusting the rotary knob left or right to change the pressure to the cylinder. This is beneficial when planting through a wet part of the field and allows the tool to be quickly raised out of the soil to decrease the risk of pushing the tool into the wet soil. By pressing the rotary knob again, the system returns to the predetermined pressure setting and maintains this pressure automatically.

When the accessory is a sweep, such as one with the discs 98 and gauge wheels 100, the depth of the sweep can be quickly and easily adjusted by the depth control assembly 76, such that the gauge wheels 100 on each side of the sweep can be moved in unison, relative to the discs, such that the depth which the discs penetrate the soil can be increased or decreased, depending upon the debris or material being removed in front of the row planter opener discs 22.

The invention has been shown and described above with the preferred embodiments, and it is understood that many modifications, substitutions, and additions may be made which are within the intended spirit and scope of the invention. From the foregoing, it can be seen that the present invention accomplishes at least all of its stated objectives.

What is claimed:

1. An accessory for use with an agricultural row planter mounted on a tool bar, comprising:
 a first tool assembly;
 a second tool assembly;
 a linkage assembly extending from the tool bar in front of the agricultural row planter;
 one of the first and second tool assemblies being selectively mounted on the linkage assembly using a quick coupler connection so as to reside below the tool bar and in front of the agricultural row planter;
 the quick coupler connection including hooks on the first and second tool assemblies to hook onto the linkage assembly, and retained with a single, removable retention member extending horizontally through the linkage assembly above the hooks for securing the hooks to the linkage assembly;
 the first and second tool assemblies being interchangeable with one another; and
 an actuator to pivot the linkage assembly between raised and lowered positions.

2. An accessory for an agricultural planter row unit mounted to a tool bar, comprising:
 a first frame supporting a rotatable member;
 a bracket assembly for mounting the first frame to the tool bar ahead of the agricultural planter row unit;
 the rotatable member being movable between a lowered position engaging the ground and a raised position disengaged from the ground;
 the first frame having hooks for mounting the first frame to the bracket assembly; and
 a single retention pin extending horizontally through the bracket assembly above the hooks to retain the first frame on the bracket assembly.

3. The accessory of claim 2 wherein the bracket assembly includes pivotal link arms connected to the tool bar.

4. The accessory of claim 3 further comprising an actuator to pivot the pivotal link arms, thereby moving the rotatable member between the lowered and raised positions.

5. The accessory of claim 3 wherein the frame is free from threaded fasteners.

6. The accessory of claim 2 further comprising a second frame with a tool, and being interchangeable with the first frame.

7. An accessory for an agricultural row planter, comprising:
 a bracket extending downwardly from the tool bar; and
 a tool hooked to the bracket and retained by a pin extending horizontally through the bracket to preclude the tool from becoming unhooked from the bracket, the tool being adapted to work the soil.

8. The accessory of claim 7 wherein tool is movable between a lowered position engaging the soil and a raised position spaced above the soil.

9. The accessory of claim 8 wherein the tool resides in front of the tool bar when in the lowered position.

10. The accessory of claim 7 wherein the tool includes a frame with opposite sides, and a hook on each side for retentively connecting to the bracket assembly.

11. The accessory of claim 10 wherein the tool further includes a rotatable member on the frame to work the soil when the tool is in the lowered position.

12. The accessory of claim 11 wherein the rotatable member is a debris cleaner.

13. The accessory of claim 7 further comprising a second tool, and wherein the tool and the second tool have different functions and are interchangeable with one another.

\* \* \* \* \*